United States Patent
Adams Ryan et al.

(10) Patent No.: US 12,046,259 B2
(45) Date of Patent: Jul. 23, 2024

(54) SYSTEM AND METHOD FOR PROVIDING ADVANCED CONTENT INTERACTIVITY FEATURES

(71) Applicant: Rovi Guides, Inc., San Jose, CA (US)

(72) Inventors: Stephanie M. Adams Ryan, San Francisco, CA (US); Reda Harb, Bellevue, WA (US)

(73) Assignee: Rovi Guides, Inc., San Jose, CA (US)

(*) Notice: Subject to any disclaimer, the term of this patent is extended or adjusted under 35 U.S.C. 154(b) by 72 days.

(21) Appl. No.: 17/526,946

(22) Filed: Nov. 15, 2021

(65) Prior Publication Data

US 2023/0154498 A1   May 18, 2023

(51) Int. Cl.
| | |
|---|---|
| *G11B 27/036* | (2006.01) |
| *G11B 27/34* | (2006.01) |
| *H04N 5/278* | (2006.01) |
| *H04N 21/439* | (2011.01) |
| *H04N 21/4728* | (2011.01) |
| *G09B 7/04* | (2006.01) |
| *G09B 7/08* | (2006.01) |
| *G09B 19/00* | (2006.01) |

(52) U.S. Cl.
CPC .......... *G11B 27/036* (2013.01); *G11B 27/34* (2013.01); *H04N 5/278* (2013.01); *H04N 21/4394* (2013.01); *H04N 21/4728* (2013.01); *G09B 7/04* (2013.01); *G09B 7/08* (2013.01); *G09B 19/003* (2013.01)

(58) Field of Classification Search
CPC ...... G11B 27/036; G11B 27/34; H04N 5/278; H04N 21/4394; H04N 21/4728; G09B 7/04; G09B 7/08; G09B 19/003
See application file for complete search history.

(56) References Cited

U.S. PATENT DOCUMENTS

| | | | |
|---|---|---|---|
| 2005/0042591 A1* | 2/2005 | Bloom .................. | G11B 27/34 434/308 |
| 2006/0174264 A1* | 8/2006 | Candelore .......... | H04N 21/4532 725/35 |
| 2011/0064388 A1* | 3/2011 | Brown ................. | H04N 21/816 704/E13.011 |
| 2013/0257871 A1* | 10/2013 | Goldstein ............ | G11B 27/034 345/440 |
| 2016/0117311 A1* | 4/2016 | Maetz ................... | G06F 40/35 704/9 |

(Continued)

*Primary Examiner* — Sunghyoun Park
(74) *Attorney, Agent, or Firm* — Haley Guiliano LLP

(57) ABSTRACT

Systems and methods for interactively engaging consumers of a media asset are disclosed. The methods allow selection and personalization of a media asset character's name, voice, or dialogue while the media asset is being consumed. The personalization may be propagated through the entire media asset or additionally to other episodes, sequels, and related media assets by identifying and replacing associated metatags. The system determines whether the media asset is being consumed as a group watch where its members are consuming the media asset from different IP addresses or being consumed by viewers in the same room to determine the type of changes allowed. The methods also present queries to engage the viewer, such as by the character asking them a question, and provide supplemental videos to aid in responding to the queries. The responses to queries may also determine the path a story takes in the media asset.

21 Claims, 20 Drawing Sheets

(56) References Cited

U.S. PATENT DOCUMENTS

| | | | |
|---|---|---|---|
| 2018/0342095 A1* | 11/2018 | Walsh | G06F 3/017 |
| 2020/0051582 A1* | 2/2020 | Gilson | H04N 21/233 |
| 2020/0202735 A1* | 6/2020 | Santos-Sheehan | G09B 19/00 |
| 2020/0265829 A1* | 8/2020 | Liu | G10L 13/033 |
| 2021/0225407 A1* | 7/2021 | Prakash | G11B 27/034 |

* cited by examiner

| Person Talking / Relationship | Character Original Name | Replaced Name |
|---|---|---|
| John (Dad) | Michael | Son |
| Sally (Mom) | | Cutie |
| Robert (Older Brother) | | Bro |
| Jennifer (Sister) | | Mikey |
| Paul (Friend) | | Bestie |

FIG. 8

| Person Talking / Relationship | Character Original Name | Context / Setting | Replaced Name |
|---|---|---|---|
| John (Dad) | Michael | Playful | Buddy |
| | | Angry | Mikey |
| | | At home | Son |
| | | In School | Michael |

SYSTEM AND METHOD FOR PROVIDING ADVANCED CONTENT INTERACTIVITY FEATURES

FIELD OF INVENTION

Embodiments of the present disclosure relate to displaying a media asset and providing interactivity features to engage a viewer with the characters in the media asset, including, change parameters of the characters, change character's dialogues, be part of the story and navigate the story, obtain supplemental and related media assets, and learn a life skill.

BACKGROUND

Interactive videos or "play-along" videos as well as interactive storybooks are known in the art. These videos and storybooks allow children to interact and learn with characters they love. This helps children grow their confidence by building academic skills and healthy habits.

One such example of a play-along video service is "Noggin"™ (Noggin is a trademark owned by Viacom International Inc.). Using Noggin, children interact with displayed videos via gestures such as tapping, swiping, or even via verbal commands. Such features allow the content to become more engaging, especially for kids, and help them develop cognitive and emotional skills. Other services, such as Netflix™ (Netflix is a trademark owned by Netflix, Inc.), offer some titles in interactive form that allow users to choose characters and the choices can lead to different adventures and stories. Such choices, however, are finite in nature and a user's choice leads to playing corresponding video segment(s) associated with such choice/plot.

Interactive books are another interactive tool used by many, especially parents of toddlers to engage the toddler with the book and boost their development and hone their motor skills or teach the alphabet.

Although some level of interaction is provided, the current tools, programs, and books are limited and do not allow personalization and customization for each individual. Many present predefined answers and options limit the interactive exchange between the child and the program. Another limitation is that such programs, tools, and books cater only to children and do not provide customization for higher education or adults desiring to have complex interactive exchanges with a media asset. The present invention could also uniquely benefit atypical adults and children, people with learning differences, or those suffering from brain disorders or injuries by allowing for a highly customizable interactive media experience.

As such, regardless of the user's age, there is a need to provide a method and system that allows a deeper and more intelligible level of interactive exchange allowing for personalization and customization to fully integrate the individual and keep them engaged in the program.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 8 is a table of rule-based name or voice replacement options, in accordance with some embodiments of the disclosure;

FIG. 9 is a table of context-based name or voice-replacement options, in accordance with some embodiments of the disclosure;

DETAILED DESCRIPTION

Figure 1:
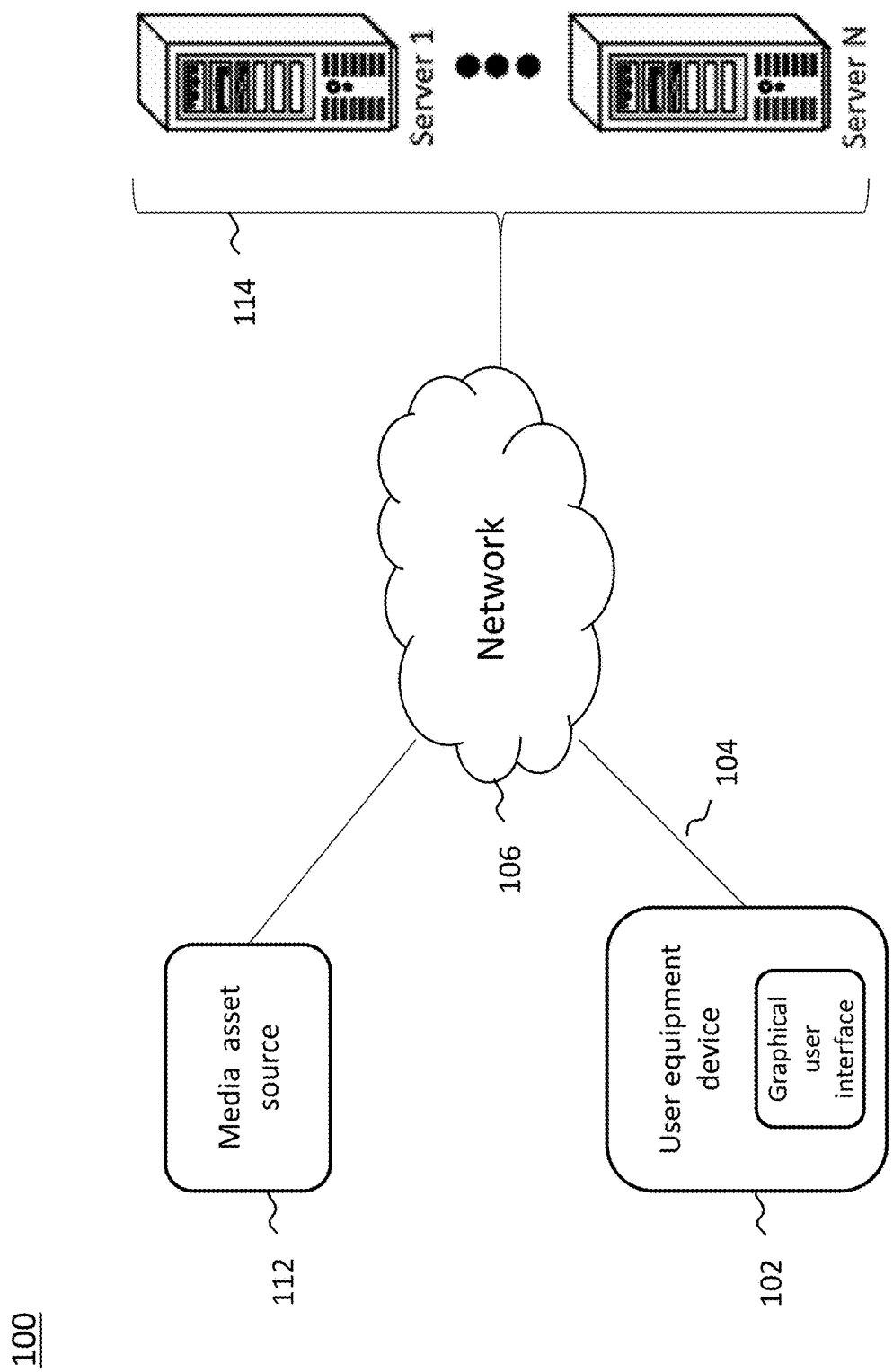
FIG. 1 is a block diagram of an exemplary system for providing interactivity tools for engagement with a media asset, in accordance with some embodiments of the disclosure.

In accordance with some embodiments disclosed herein, some of the above-mentioned limitations are overcome by providing interactive tools to change a character's name in a media asset, using the character or viewer's own voice when the name is addressed in the media asset, using speech synthesizers to match voice with the character, propagating the character's changed name throughout the media asset and other related media assets, providing tools to answer a question or make a statement that navigates the story to one or more predetermined directions based on the response to the question or the statement, transmitting questions to the group or a targeted question to a specific viewer to obtain their response, analyzing interactive exchange between the viewer and the media asset to determine whether supplemental videos can be used as a learning tool, allowing personalization and customization for each viewer in a group-watch or a live-watch setting and rewriting caption files based on character name changes or story changes.

In some embodiments, the systems and methods allow a viewer consuming the media asset to change the name of a character in the media asset and personalize the name to their liking. The changing of the name can be accomplished by an interactive system receiving a selection of a character and a suggested name change for the selected character. In response to receiving the name, also referred to as the preferred name, the system changes the name of the character in the media asset. In some embodiments, the system may determine the appropriateness of the name, such as based on parental control settings, and change names that complies with appropriateness standards for the viewer's age group. For example, certain names and words may be inappropriate for children under 12 and the parents may have set certain parental controls in their profile to detect such inappropriate words. In some embodiments, the name change of the character is performed automatically and in real-time while the media asset is being displayed.

In some embodiment, the system may identify the locations in the media asset where a character's name is uttered. The system may then generate metatags for such locations. The system may also capture start and end times for each utterance and identify them by timestamps. The metatags and timestamps may be used to replace with the preferred name and placed within the same time frame of the timestamps into the media asset. The preferred name may be synthesized using a voice synthesizer prior to performing the replacement.

Similar to a character's name change, a viewer consuming the media asset may also change the voice of the character, change the voice when the character's name is addressed with the changed name, or change the voice of a sentence or catch-phrase uttered in the media asset by one or more characters.

When a voice change request is received by the system, the system may use a voice synthesizer to match the voice parameters, such as tone, pitch, volume, to sync the new voice with the display. The viewer may select an option to change the voice to their own, or some other voice, when their favorite character's changed name is addressed or when a statement or catch-praise is uttered in the media asset.

In some embodiments, the change of character's name may be based on rules and context. For example, depending on which character in the media asset is addressing the selected character, they may address the selected character by a different preferred name, i.e., a mom character in the media asset may address their son Michael, also a character in the media asset, as "Cutie," while a dad character in the media asset may address Michael as "Son." As such, the viewer consuming the media asset may define certain rules on name changes to allow other characters to address their selected character using different names.

In yet another embodiment, the viewer requesting the name change of their character may also define rules that are context based for the name change. For example, the context may be that the character is being displayed in a school setting, at home, or being addressed by someone who is in a playful or angry mood, and the viewer may provide different preferred character names based on the context such that if the context matches, then the provided preferred character name based on the context is used in the media asset.

In some embodiments, the viewer may be consuming the media asset by themselves and in other embodiments the viewer may be consuming the media asset in either a live-watch or a group-watch setting. When the viewer is consuming the media asset by themselves, then the name change may be made by the system, either automatically or after determining its appropriateness.

If a viewer is consuming the media asset in a live-watch or a group-watch setting where other viewers are present, then the system may determine if the suggested name change, also referred to as the preferred name of a character, conflicts with another name change provided by another viewer. For example, in a group-watch setting, a group of authorized members can consume the media asset either at the same or a separate time. In such a group-watch setting, if a first viewer, who is a member of the watch group, suggests a name for their favorite character, then the system determines if any other viewer in the group watch, such as a second member, has also suggested a name change for the same character with a different name than that suggested by the first viewer. If conflicting name-change requests are detected, then the system may provide resolution options such as: a) first viewer or the second viewer agreeing with each other on one of the names suggested, b) polling members of the watch group to determine a name change, c) or obtaining a majority vote to change the name. Alternatively, the system may also change the name for the first and the second viewer such that their own preferred name change appears when they are consuming the media asset and not showing the name change to the entire watch group.

Likewise, in a live-watch setting, where a plurality of viewers are consuming the media asset in one room, the system may use the media asset's camera, microphone, or some other input to determine which viewer is present and consuming the media asset. The system may provide pop-up or prompts on the display screen of the media device displaying the media asset to resolve any conflict in a similar manner as in a group-watch setting.

In some embodiments, the methods and systems also propagate the name, voice, and dialogue change throughout the media asset. In other embodiments, the change is made to specific instances in the media asset. In yet another embodiment, the changes are propagated to other media assets that are part of the same series, sequel, or prequel, or other media assets that share the same characters.

In some embodiments, the methods and systems may determine whether a viewer who has selected a character is physically present and consuming the media asset. Based on the determination, the system may vary the amount of screen time of a character that correlates with the presence of the associated viewer. In one example, viewer A and viewer B are consuming a media asset in a group-watch setting. In this example, viewer A has selected character A as their favorite character and viewer B has selected character B as their favorite character. In this setting, if viewer A and B are consuming the media asset then characters A and B will be displayed. But if viewer A stops consuming the media asset, then their character may not be displayed. As such the system, to engage its viewers, displays their favorite characters whenever the viewer associated with their favorite character is present.

In another embodiment, the system may determine whether the character is essential to the segment displayed and factors such determination in displaying the character, i.e., if the character is essential to the segment and the associated viewer is not present, the system may continue to display the character until the character is no longer essential to the segment. In some embodiment, an artificial intelligence (AI) algorithm may be used to determine whether the character is essential to the segment.

In some embodiments, the system may ask questions/ queries. For example, the system may ask a general question to all viewers consuming the media asset or ask a targeted question to a viewer or have the character directly address the viewer and ask targeted questions. In instances when the viewer is not able to answer the question or does not answer within a certain time, then the system may prompt the user a threshold number of times. The system may also generate a search template and access supplemental videos/media assets available on the internet, or a local library, or in the playlist, to which the viewer is authorized to access, and present the links to the viewer such that the viewer may consume the supplemental media asset and such consumption will aid them in answering the targeted question. For example, if the targeted question relates to a math problem or how a rocket is launched, then links to supplemental videos that provide a tutorial to the math problem or a background on rocket launches are provided to the viewer.

In yet another embodiment, the system may present queries and/or multiple options to the viewer to answer or select. Based upon the answer to the question or selection of one of the options, the system may navigate the story to a particular path. For example, if the system asks a question, which path should Jack take next and presents the options of forest, mountain, and ocean, then the system may navigate the story to a path based on the option selected. In another embodiment, if the system asks a math question, then the answer to the question may navigate the next segment presented to the viewer.

The system may also use machine learning (ML) algorithms to perform some of the interactive functions described. For example, the system may use ML to analyze viewer consumption history of media assets to analyze the user's likes and dislikes and use such analyzed data to provide interactive suggestions, such as suggest a name change, suggest renaming a dialogue etc. The system may also use ML to rewrite a caption file with changes that may be desirable to the viewer based on their consumption history and changes made previously.

The system may also use an AI algorithm to perform some of the interactive functions described. For example, the system may use AI to determine whether an answer provided to a target question is satisfactory. If the answer is not satisfactory, then the system may provide links to supplemental videos that can be used as a learning guide by the viewer to answer the targeted question. AI may also be used in a group-watch setting to vary the screen time of a character such that the character's screen time is minimized if the character is not integral to the segment and the associated viewer is not present or active. Such determination of whether the character is integral to the segment may be analyzed using AI.

Figure 2:
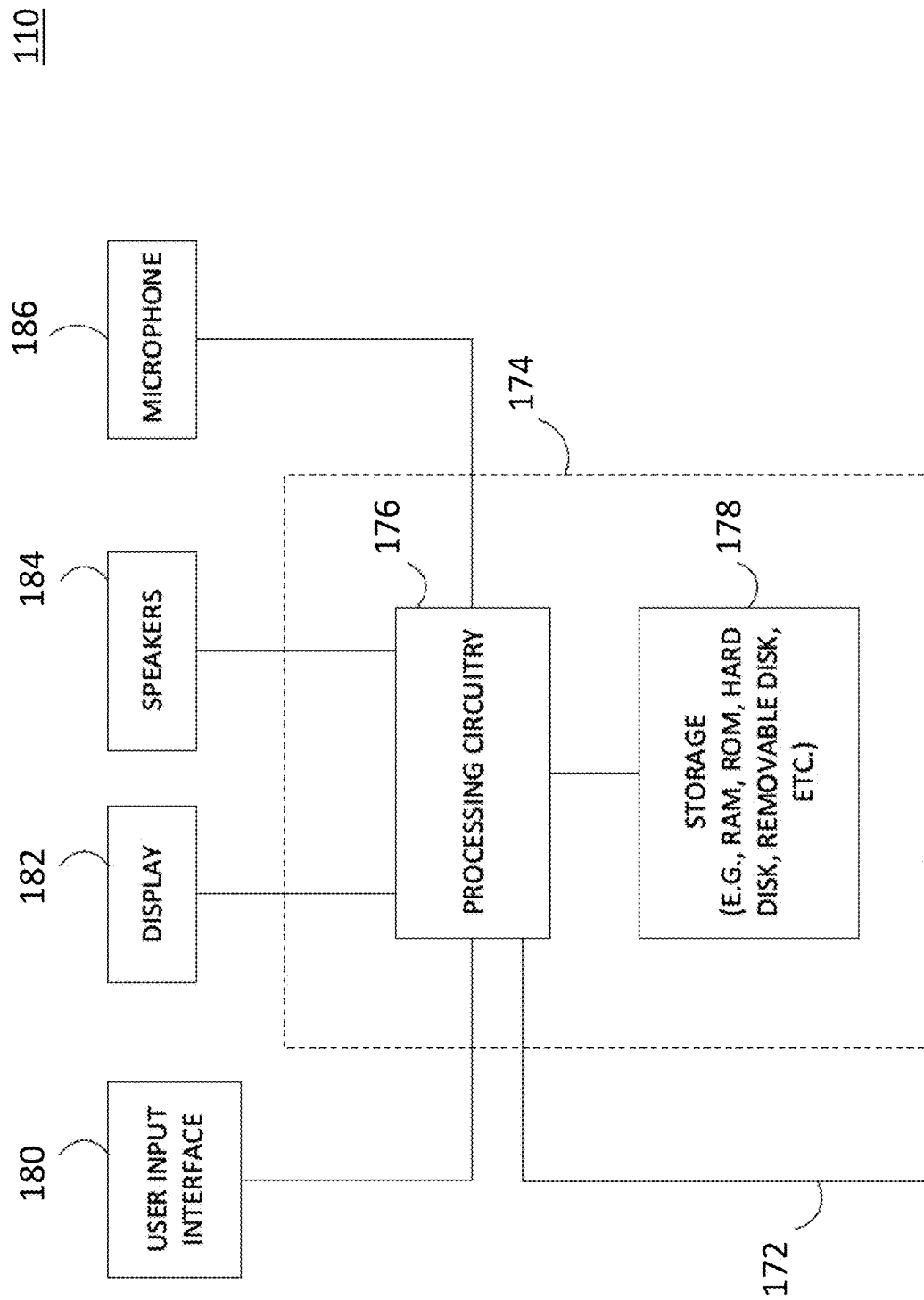
FIG. 2 is a block diagram of a generalized media device, in accordance with some embodiments of the disclosure.

FIGS. 1-2 describe exemplary devices, systems, servers, and related hardware for providing interactive tools to change a character name, use the character or viewer's own voice when the name is used, using speech synthesizers, propagating the changed name throughout the media asset and other related media asset, generate metatags for locations where a character name is uttered or identify start/end time stamps of such utterances, provide tools to answer a question or make a statement that navigates the story to one or more directions that are configured, transmit questions to the group or to a targeted viewer to obtain their response, analyze interactive exchange between the viewer and the media asset to determine whether supplemental videos can be used as a learning tools, allowing personalization and customization for each viewer in a group-watch or a live-watch setting and rewriting captions files based on name changes or story changes.

In the system 100, there can be more than one user equipment device 102 but only one is shown in FIG. 1 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 106.

The user equipment devices may be coupled to communications network 106. Namely, the user equipment device 102 is coupled to the communications network 106 via communications path 104. The communications network 106 may be one or more networks including the Internet, a mobile-phone network, mobile-voice or data network (e.g., a 4G, 5G, or LTE network), cable network, public switched telephone network, or other types of communications network or combinations of communications networks. The path 104 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 104 can be a wireless path. Communication with the user equipment device may be provided by one or more communications paths but is shown as a single path in FIG. 1 to avoid overcomplicating the drawing.

The system 100 also includes media asset sources, such as video asset sources 112, and one or more servers 114, which can be coupled to any number of databases providing information to the user equipment devices. The information sources 112 represent any computer-accessible sources, such as servers, databases, platforms (such as video sharing platforms) that store media assets, such as video assets. The server 114 may store and execute various software modules, such as for example for providing interactive tools to change a character name, use the character or viewer's own voice when the name is used, using speech synthesizers, propagating the changed name throughout the media asset and other related media asset, provide tools to answer a question or make a statement that navigates the story to one or more directions that are configured, transmit questions to the group or to a targeted viewer to obtain their response, analyze interactive exchange between the viewer and the media asset to determine whether supplemental videos can be used as a learning tools, allowing personalization and customization for each viewer in a group-watch or a live-watch setting and rewriting captions files based on name changes or story changes.

In some embodiments, the user equipment device 102, media asset sources 112, and server 114 may store metadata associated with media assets. In some embodiments, the server may transmit a command to cause the display of a user interface on the display screen of a media asset device. The user interface may be used by the user to select preferences, execute commands, and approve or reject suggested preferred names. The user interface may also be used by the system to obtain user profiles or user consumption history.

FIG. 2 shows a generalized embodiment of a user equipment device 200, in accordance with one embodiment. In an embodiment, the user equipment device 200, is the same user equipment device 102 of FIG. 1. The user equipment device 200 may receive content and data via input/output (I/O) path 202. The I/O path 202 may provide audio content (e.g., broadcast programming, on-demand programming, Internet content, content available over a local area network (LAN) or wide area network (WAN), and/or other content) and data to control circuitry 204, which includes processing circuitry 206 and a storage 208. The control circuitry 204 may be used to send and receive commands, requests, and other suitable data using the I/O path 202. The I/O path 202 may connect the control circuitry 204 (and specifically the processing circuitry 206) to one or more communications paths. I/O functions may be provided by one or more of these communications paths but are shown as a single path in FIG. 2 to avoid overcomplicating the drawing.

The control circuitry 204 may be based on any suitable processing circuitry such as the processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The providing of interactive tools to change a character name, use of the character or viewer's own voice when the name is used, use of a speech synthesizer, propagating of the changed name throughout the media asset and other related media asset, providing of the tools to answer a question or make a statement that navigates the story to one or more directions that are configured, transmitting of the questions to the group or to a targeted viewer to obtain their response, analyzing of the interactive exchange between the viewer and the media asset to determine whether supplemental videos can be used as a learning tools, allowing the personalization and customization for each viewer in a group-watch or a live-watch setting and rewriting of the captions files based on name changes or story changes and related functions and processes as described herein can be at least partially implemented using the control circuitry 204. The rewriting of the captioned file based on character name change and story navigation in a particular direction based on input and answers provided by a viewer and having the manifest file reference the name and story changes such that the rewritten manifest caption file can be used instead of the original captioned file and related functions and processes as described herein can also be at least partially implemented using the control circuitry 204. The processes as described herein may be implemented in or supported by any suitable software, hardware, or combination thereof. They may also be implemented on user equipment, on remote servers, or across both.

In client-server-based embodiments, the control circuitry 204 may include communications circuitry suitable for communicating with one or more servers that may at least provide interactive tools to change a character name, allow the use of the character's voice or viewer's own voice when the name is used, use speech synthesizers, propagate the changed name throughout the media asset and other related media asset, provide tools to answer a question or make a statement that navigates the story to one or more directions that are configured, transmit questions to the group or to a targeted viewer to obtain their response, analyze interactive exchange between the viewer and the media asset to determine whether supplemental videos can be used as a learning tools, allowing personalization and customization for each viewer in a group-watch or a live-watch setting and rewriting captions files based on name changes or story changes, including implementing caption and rewritten manifest files and implement ML and AI algorithms, generate metatags for locations where a character name is uttered or identify start/end time stamps of such utterances, and related functions and processes as described herein. The instructions for carrying out the above-mentioned functionality may be stored on one or more servers. Communications circuitry may include a cable modem, an integrated service digital network (ISDN) modem, a digital subscriber line (DSL) modem, a telephone modem, ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 208 that is part of the control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum-storage devices, gaming consoles, gaming media, or any other suitable fixed or removable storage devices, and/or any combination of the same. The storage 208 may be used to store media files, character names, replaced character names, profiles of viewers, group names and viewers associated with a group watch, ML and AI algorithms, manifest and caption files, viewer consumption history, and metadata associated with the media asset. Nonvolatile memory may also be used (e.g., to launch a boot-up routine and other instructions). Cloud-based storage, described in relation to FIG. 1, may be used to supplement the storage 208 or instead of the storage 208.

The control circuitry 204 may include audio generating circuitry and tuning circuitry, such as one or more analog tuners, audio generation circuitry, filters or any other suitable tuning or audio circuits or combinations of such circuits. The control circuitry 204 may also include scaler circuitry for upconverting and down converting content into the preferred output format of the user equipment device 200. The control circuitry 204 may also include digital-to-analog converter circuitry and analog-to-digital converter circuitry for converting between digital and analog signals. The tuning and encoding circuitry may be used by the user equipment device 200 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 208 is provided as a separate device from the user equipment device 200, the tuning and encoding circuitry (including multiple tuners) may be associated with the storage 208.

The user may utter instructions to the control circuitry 204, which are received by the microphone 216. The microphone 216 may be any microphone (or microphones) capable of detecting human speech. The microphone 216 is connected to the processing circuitry 206 to transmit detected voice commands and other speech thereto for processing. In some embodiments, voice assistants (e.g., Siri, Alexa, Google Home and similar such voice assistants) receive and process the voice commands and other speech.

The user equipment device 200 may include an interface 210. The interface 210 may be any suitable user interface, such as a remote control, mouse, trackball, keypad, keyboard, touch screen, touchpad, stylus input, joystick, or other user input interfaces. A display 212 may be provided as a stand-alone device or integrated with other elements of the user equipment device 200. For example, the display 212 may be a touchscreen or touch-sensitive display. In such circumstances, the interface 210 may be integrated with or combined with the microphone 216. When the interface 210 is configured with a screen, such a screen may be one or more monitors, a television, a liquid crystal display (LCD) for a mobile device, active-matrix display, cathode-ray tube display, light-emitting diode display, organic light-emitting diode display, quantum-dot display, or any other suitable equipment for displaying visual images. In some embodiments, the interface 210 may be HDTV-capable. In some embodiments, the display 212 may be a 3D display. The speaker (or speakers) 214 may be provided as integrated with other elements of user equipment device 200 or may be a stand-alone unit. In some embodiments, the display 212 may be outputted through speaker 214.

The user equipment device 200 of FIG. 2 can be implemented in system 100 of FIG. 1 as user equipment device 102, but any other type of user equipment suitable for providing interactive tools to change a character name, use the character or viewer's own voice when the name is used, using speech synthesizers, propagating the changed name throughout the media asset and other related media asset, generate metatags for locations where a character name is uttered or identify start/end time stamps of such utterances, provide tools to answer a question or make a statement that navigates the story to one or more directions that are configured, transmit questions to the group or to a targeted viewer to obtain their response, analyze interactive exchange between the viewer and the media asset to determine whether supplemental videos can be used as a learning tools, allowing personalization and customization for each viewer in a group-watch or a live-watch setting and rewriting captions files based on name changes or story changes. The user equipment device 200 of any other type of suitable user equipment suitable may also be used for implementing caption and rewritten manifest files that have changed names and a story direction and implement ML and AI algorithms, and related functions and processes as described herein. For example, user equipment devices such as television equipment, computer equipment, wireless user communication devices, or similar such devices may be used. User equipment devices may be part of a network of devices. Various network configurations of devices may be implemented and are discussed in more detail below.

In one embodiment, the processes described herein, including the processes that change character name, dialogue, voices, navigation of a story based on answers provided, changes to catch-phrases and all the other changes described, may be implemented by rewriting the original caption file with a rewritten caption file that includes all the changes.

In another embodiment, the system may include a manifest file, which is used by the system to configure and deploy various functions. In one embodiment, the manifest file references the caption file. Streaming protocols such as DASH and HLS rely on the use of manifest files to request media segment files (e.g., small files that are few seconds long) to play video and/or audio data. In operation, the manifest file may be sent along with the media asset before playback of the media asset begins such that it may be used by the media device to request various segments of the media asset to be played.

The caption file referenced by the manifest file, also referred to as a side car" file, may be sent separately from the media asset. The side car file may be used by the media deice to render closed-caption content, which includes timing information that can be used to ensure that the video playback and the presentation of the related closed-captions are in synch.

In another embodiment, the system may rewrite the closed-caption file. In this embodiment, the system may use the changes made to the character's names, changes to dialogue in the media asset, a path taken in a story that is based on a response provided by the viewer and other sources of data to rewrite the closed-caption file and customize and personalize it to the viewer. The original caption file may be replaced with the rewritten/manifest caption file and used during the playback of the media asset. When the file is rewritten, the manifest file references the newly rewritten file instead of the original captions file. The system may rewrite the caption file at any given time, such as before, during, or after the playback of the media asset. The system may also rewrite the caption file associated with a media asset, or a plurality of media assets, when the media asset(s) are placed into a playlist, selected for display, or scheduled for future consumption.

A plurality of methods may be used to identify locations in a media asset where a character name is uttered. For example, in another embodiment, the closed-caption file, as described above, may be used to identify locations where the character name is uttered as well as determine the timing of start and end of the utterance. In another embodiment, locations in a media asset where a character name is uttered may also be determined by transcribing the audio portion of the content to text to identify the various characters (e.g., identifying various voice profiles) as well as locating specific words or character names that are uttered within the transcription. In yet another embodiment, existing keyword spotting technologies can be used to locate specific text such as keywords in the media asset.

Figure 3A:
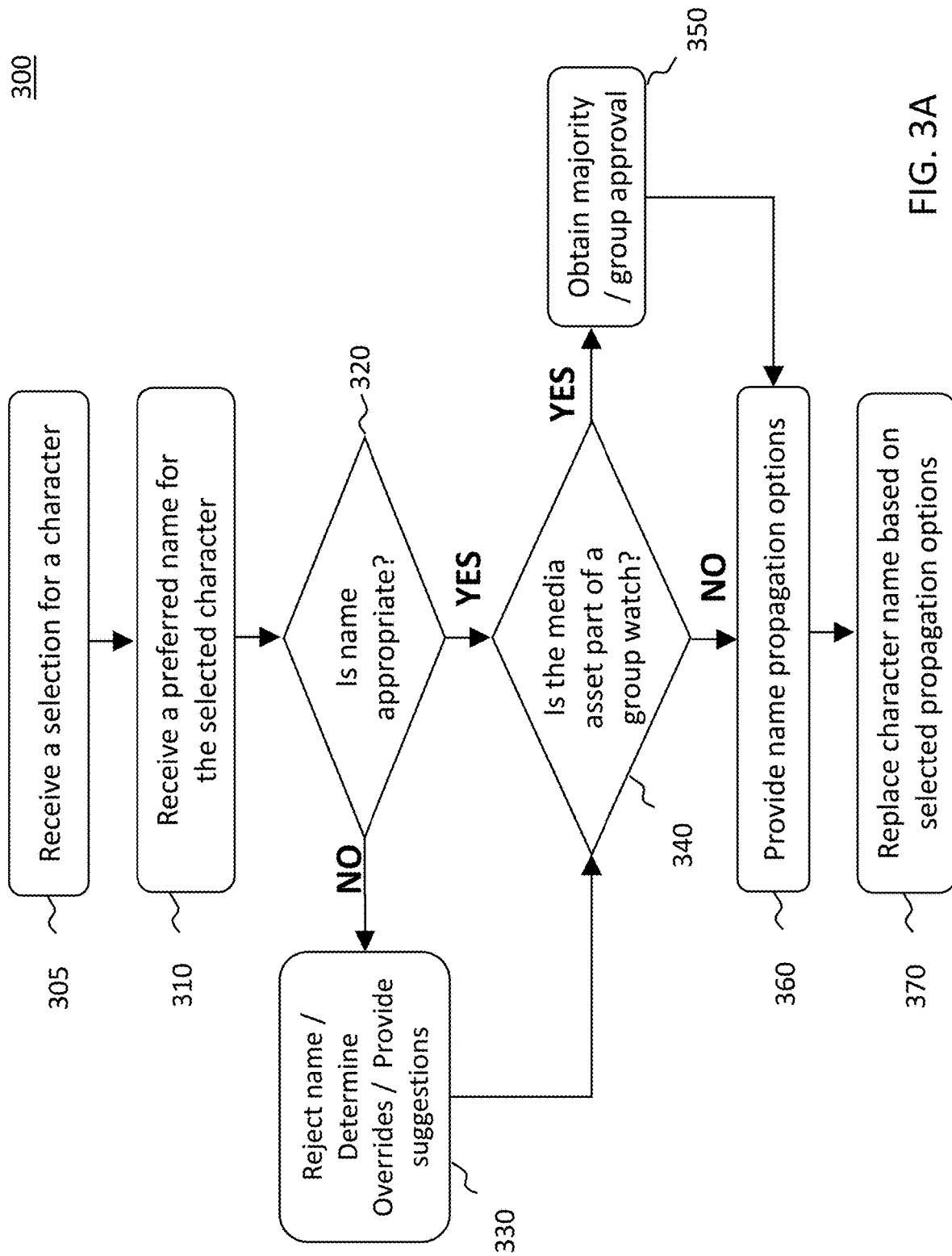
FIG. 3A is flowchart of a process for replacing a character's name in one or more media assets with a preferred name, in accordance with some embodiments of the disclosure.

FIG. 3A is flowchart of a process for replacing a character name in a media asset with a preferred name and propagating the replaced name, in accordance with some embodiments of the disclosure. The process 300 allows customization of a character in a media asset by one or more viewers of the media asset. The process also determines the appropriateness of the name and once approved propagates it by changing the character name while the media asset is playing to one or more instances, or to all instances, in the media asset where the character name is mentioned. The personalization and customization, among providing other benefits, keeps the viewer engaged and entertained when their preferred name is taken instead of the originally given character name. The process 300 also enables advanced interactivity with content of the media asset by allowing the users (also referred to as viewers, individuals, or members) to associate themselves with the main characters, or other preferred characters, in the content being viewed and provide a feeling or experience of immersing themselves, their preferred names, or voices, into the program, such as the movie or cartoon.

The process 300, in one embodiment, begins at block 305. The system, such as the system depicted in FIG. 1, receives a selection of a character. In one embodiment, the character may be from a TV show or series such as "SpongeBob" or the selection may include multiple characters such as "SpongeBob," "Gary," "Sandy Cheeks," "Patrick Star," "Mrs. Puff," "Plankton," and "Mr. Krabs." from the same TV show. Such characters may be different in the sense that "Gary is a snail/pet (SpongeBob's pet) while Mrs. Puff is a pufferfish/teacher.

The selection received may be through a touch screen on a television, a tap on the character on an interactive user interface, such as an interface on a mobile phone or a tablet, or through a remote-control device allowing selection of a character. A viewer, which may be a child, teen, or an adult may select the character of their interest while watching the media asset. For example, a child might prefer one character over another while watching their favorite shows, such as "SpongeBob" might be viewer A's favorite character, while viewer B's favorite character might be SpongeBob's starfish friend and neighbor, "Patrick Star." The viewer may make their selection based on their favorite character. From the above example, viewer A may select "SpongeBob" and viewer B may select "Patrick Star."

Once a selection in block 305 is made, the viewer may rename their favorite character to a desired name, also referred to as preferred name, such as their own name or any name or word of their liking is used. Additionally, a character that has been renamed by Michael may also be renamed by another viewer, Stacy. She may also rename "SpongeBob" to a different name that she prefers. The naming may or may not be exclusive to a character. For example, when multiple viewers are watching the same media asset in a group-watch setting, as will be described in further detail during the discussion of group watch below, multiple viewers may rename the same character and the system may determine when to play which rename based on the presence of the viewer.

In some embodiments, a household may include more than one child that watches the same media asset. In such embodiments, more than one character's name can be changed where each of the three children may each choose a name for the same character or for different characters.

The preferred name, or the rename, of the character's original name is received by the system and processed at block 310. Some processing may include determining whether the name is appropriate and other processing may include determining whether to use the viewers voice or the characters voice in renaming the character, as will be further described during the discussion of FIG. 5. Processing may also be performed to edit the provided name, such as, in some embodiments, phonetically correcting the pronunciation of the name or correcting the spelling of the name.

In one embodiment, the preferred name is received based on the viewer's input using a graphical user interface. In another embodiment, instead of receiving the preferred name from the viewer, an ML algorithm is used to analyze the viewer's consumption history. The ML determines consumption patterns that are indicative of the user's likes, dislikes, and changes the user has made when viewing previous media assets. The ML data may be used by an AI algorithm to predict which characters which the viewer may be interested in renaming and automatically identifying the character as well as a suggested preferred name, or a plurality of suggested preferred names, that can be approved by the viewer. The AI algorithm may also suggest voice changes, dialogues, and other factors of the character that the user may change and provide suggestions on changes. The ML and AI algorithm may also communicate with crowd sourcing algorithms to determine what other viewers have named the character, especially in the viewer's social circle, and use those names or an alternation of the names as suggestions to the viewer for character name changes.

The ML algorithm may also determine the types of characters the viewer prefers. For example, the viewer may not prefer villains or a character that portrays a certain image. The viewer may also not prefer a character that is not prominent in the media asset. On the other hand, the viewer may prefer characters that are not the main character or a character that is funny or cool to them. The ML algorithm may detect such preferences based on prior consumption history and provide them to the AI algorithm such that the characters and name, voice, dialogue suggestions can be made. In some instances, the system may automatically make the change based on data from the ML and AI algorithms and provide a prompt to the user to override the change if they do not wish to change based on the suggestions provided. The system may also provide a top 3 or 5 character name, voice, dialogue suggestions and rank the suggestions such that the viewer can explore the suggestions and select one of the suggestions to implement.

At block 320, a determination is made by the system, such as by using the control circuitry of the system depicted in FIG. 2, whether the preferred name is appropriate. The appropriateness may be determined based on parental controls provided on a media device on which the media asset is going to be watched. Appropriateness may also be determined by comparing the preferred name for its age appropriateness, language appropriateness, and cultural appropriateness, by using systems, services, and online sources that determine appropriateness. Appropriateness may also be determined based on certain blocked names that are listed in the viewers' profile, such as by the viewer's parents or guardians, or human resources of a company if the media asset is provided in a corporate setting.

If a determination is made at block 320 that the preferred name provided by the viewer for a selected character is inappropriate, then at block 330, in one embodiment, the system may reject the preferred name. In another embodiment, when an inappropriate name is detected, the system may use an AI algorithm to analyze the preferred name and either override the preferred name or provide suggestions that are alternative to the preferred name.

In one embodiment, at block 330, if a bad word is used as a preferred name, the system may analyze the inappropriateness of the name and suggest words that may contextually relate to the preferred name and are appropriate.

In another embodiment, the viewer watching may be an adult. In such scenarios, if an inappropriate name is preferred, because the viewer is an adult, and is consuming the media asset in a non-group-watch setting, the system may allow the viewer to override any rejections or alternatives suggested by the system and continue to use the preferred name regardless of its inappropriateness.

Referring back to block 320, if a determination is made that the preferred name provided by the user for their selected character is appropriate, then at block 340 another determination is made whether the media asset whose character is being renamed is part of a group watch. Similarly, once a decision is taken at block 330, such as selecting an alternate suggestion provided, or overriding an inappropriateness filter, and a preferred name is selected, then the same determination is made at block 340, i.e., a determination whether the media asset being watched is part of the group watch.

As used in this application, group watch refers to a plurality of viewers watching the same media asset either at the same time or different times from their own respective devices. Group watch also refers to a plurality of viewers watching the same media asset from different locations, such as viewer A watching it from their home and viewer B watching it from their home, which is separate home/location and a separate IP address from view A's home. A group for the group watch may be generated by one or more viewers from their respective devices. A viewer of a group watch may add other viewers to a group watch, if they have permissions, such that the viewer is able to watch the media asset with their group, such as their family, friends, or coworkers.

At block 340 if a determination is made that the media asset is part of a group watch, and the name of the character of a media asset that is part of the group watch is being renamed, then, in one embodiment, the system may obtain majority group, or approval or some or all the members of the group or some other combination thereof, prior to changing the characters original name to the preferred name. In that regard, the system may take a poll with all the members of the group watch to determine if a majority consensus exists to allow the name change. In another embodiment, if the media asset is part of a group watch, and the character name is being changed, the system may automatically change the character name if no objection is made by any of the members of the group. For example, the system may alert other members of the group that a name change is being implemented and provide a pop up, or some other type of alert, allowing the members of the group to deny the change or suggest an alternative to the suggested name.

If at block 340, a determination is made that the media asset which is not part of a group watch, or that the media asset is part of a group watch and the preferred name is approved for replacing the characters original name, then at block 360 the system may provide propagation options, also referred to as name replacement options, to the viewer for replacing the characters original name with the preferred name. These propagation options are described in further detail as part of the discussion of FIGS. 6 and 7.

At block 370, the system replaces the character's original name with their preferred name and propagates it based on the selection of the propagation option. The name replacement occurs in real time and while the media asset is currently being played. Once the characters original name is replaced, when the character's name is uttered in the media asset by the character or any other character, it is the preferred name, not the original name being uttered. For example, if a following dialogue between "SpongeBob" and "Patrick Star" occurs in the media asset:

SpongeBob: "Hey Patrick Star can you help me solve this puzzle?"

Patrick Star: "Sure SpongeBob, I would be delighted."

and viewer A renames "SpongeBob" as "Michael" and viewer B renames "Patrick Star" as "Starfi," then the dialogue would be changed to the following while the media asset is being played:

SpongeBob: "Hey Starfi can you help me solve this puzzle?"

Patrick Star: "Sure Michael, I would be delighted."

As it will be further described below in FIG. 5, the characters original names are replaced by the viewers preferred name either in the character's voice used in the media asset or the viewers voice used while renaming the character. Such replacing of the original character name with the viewer's preferred name allows the viewer to customize and personalize the name such that they feel more connected and involved in the movie, cartoon, or whatever type of media asset is being presented. It may also help the viewer stay focused, or alert, while watching the media asset as they may respond with higher alertness when their preferred name, such as their own name, is being uttered during the playing of the media asset as opposed to the character's original name thereby engaging the viewer at a higher level with the media asset.

FIG. 3A is another flowchart of a process for replacing a character name in a media asset with a preferred name and providing a plurality of name replacement options, in accordance with some embodiments of the disclosure. Like process 300 of FIG. 3A, process 380 also allows customization of a character's name in a media asset by one or more viewers of the media asset. The process provides replacement options to replace the name of the character with a preferred name in the media asset while the media asset is playing. The replacement options within a media asset include replacing the name in one or more locations where the name is uttered by another character or to all locations in the media asset. The replacement options also allow replacing the character name in media assets that are part of a series, sequels, or prequels, to which the character belongs, such as media asset Toy Story 2™, and Toy Story 3™ that are part of the series or sequels of Toy Story™. Additionally, the replacement options can also be in any other media asset that includes the same character.

The personalization and customization, among providing other benefits, keeps the viewer engaged and entertained when their preferred name is taken instead of the originally given character name. The process 380 also enables advanced interactivity with content of the media asset by allowing the users (also referred to as viewers, individuals, or members) to associate themselves with the main characters, or other preferred characters, in the content being viewed and provide a feeling of immersing themselves into the program, such as the movie or cartoon.

The process 380, in one embodiment, begins at block 382. The system, such as the system depicted in FIG. 1, at block 382, receives a preferred name for a specific character that is of interest to a viewer. The preferred name may be any name that the viewer desires to give to the character, such as their own name or some other name that is of interest to them.

In one embodiment, the preferred name may be received through an input 384. The input may be received based on the viewer using a keyboard, a remote control of a media device, or inputting the name into an electronic device having a microphone capable of receiving voice input. Any other electronic means by which an input can be received are al so contemplated.

In another embodiment, the input may be automatically received based on a consumption history analysis. For example, the system may use a ML algorithm to determine name changes made by the same viewer while consuming other media assets. Such previous name change occurrences may be analyzed to detect their pattern. The data may be used by an AI algorithm to then predict similar characters that align with the pattern for which the viewer may desire to change the name. As such, the AI algorithm may suggest a character and provide name suggestions for the character that can be approved by the viewer. The system may either automatically change the name and provide it as an input, or seek the viewer's approval, and upon approval provide the name as an input to block 382.

At block 386, the system identifies locations in their media asset where a character's name is uttered. For example, a character name, "Buzz," may appear at 20 different locations in the media asset where other characters call out "Buzz" by his name. The system identifies each of those locations along the timeline of the media asset where the character's name is uttered and generates metatags for each of those locations at block 388.

At block 390, the system determines the start and end timestamps for each of those meta tags generated. For example, if at a particular location in the media asset the name "Buzz" was uttered by another character, then the start and end time of the audio related to that specific utterance is identified by the start and end timestamp.

At block 392, the system synthesizes the preferred name using a voice synthesizer. The system may provide an option to the viewer to have their preferred name taken in the characters voice that will be uttering the name or in the viewer's own voice. For example, if Character 1 and Character 2 are uttering the name "Buzz," then the system may provide the option of using Character 1's voice when the name is uttered by Character 1 and Character 2's voice when the name is uttered by Character 2 or the viewers voice regardless of who is uttering the character's name. Likewise, other features of the system provide an option to the user for replacing a phrase in the media asset or repeating a catch phrase that is uttered by any one or more characters. The system may provide the same choices of having the replaced phrase or catchphrase uttered either in the character's voice or the viewer's own voice. In either case, in one embodiment, the system synthesizes the preferred name, or the preferred phrase or catch phrase, prior to replacing the character's name, voice, or phrase with the preferred suggestion provided.

At block 394, in one embodiment, a plurality of replacement options are provided to the viewer. In another embodiment, the system may automatically replace the name with the preferred name in the current media asset. In yet another embodiment, the system may review prior name replacement options selected by the viewer to determine which replacement option is likely to be selected and automatically select such replacement option and make the character name replacement. The system may allow the viewer and option to approve or reject the replacement.

Blocks 396, 397, 398 provide some examples of replacement options that may be provided to the viewer. For example, at block 396, the viewer may select to replace the preferred name in one or more locations or all locations in the currently displayed media asset. As such, the system may search for the metatags and the timestamps associated with the meta tags and replace the character's name with the preferred name at all the metatag locations while the media asset is being displayed.

In another embodiment, at block 397, the system may provide options for changing the character's name to the preferred name in another media asset that is part of the same series, sequel, or prequel, of the currently displayed media asset.

In yet another embodiment, at block 398, the system may provide a replacement option where the viewer can select any media asset in their library or their playlist that share the same character to replace the character's name with the preferred name in those media assets. The system may also detect a media asset identified for later viewing and query the viewer to determine if the character's name in the scheduled to view media assets should be changed and performed the change upon approval.

Figure 4:
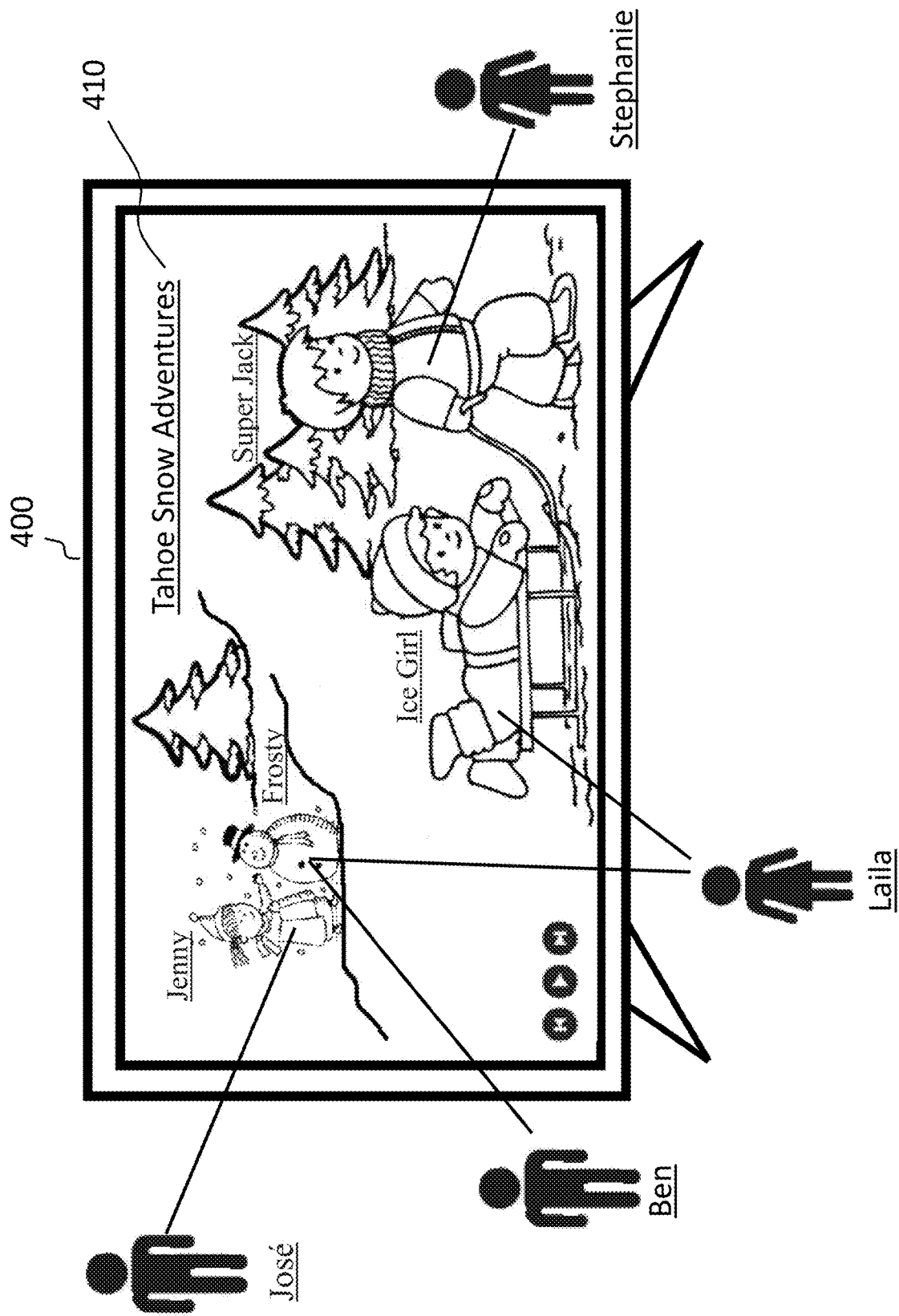
FIG. 4 is a block diagram of a media device depicting a plurality of characters and viewers that are associated with the characters, in accordance with some embodiments of the disclosure.

FIG. 4 is a block diagram of a media device depicting a plurality of characters and users that are associated with the characters, in accordance with some embodiments of the disclosure. The figure depicts a Smart Television 400 displaying a media asset called "Tahoe Snow Adventures" 410.

In one embodiment, the media asset, "Tahoe Snow Adventures," includes a plurality of characters that are children engaged in snow related activities. As depicted in this image currently displayed on the screen of the Smart TV, a girl is building a snowman on the upper far left of the screen and a boy is pulling the girl on a snow sled on the bottom right part of the screen.

In one embodiment, the characters depicted in the media asset are Jenny, Frosty, Ice Girl, and Super Jack. Jenny is depicted playing with the snowman called Frosty and adding snow to make Frosty bigger. Super Jack is depicted pulling Ice girl on the snow sled.

In one embodiment, a group may be created for group watch of the media asset, "Tahoe Snow Adventures." The group may consist of children Jose, Ben, Laila, and Stephanie. In this embodiment, Jose's favorite character may be Jenny, while Ben's favorite character may be Frosty, and Stephanie's favorite character may be Super Jack. Since a member of the group watch is allowed to select more than one character, as depicted, Laila's two favorite characters selected are Frosty and Ice Girl.

Figure 3B:
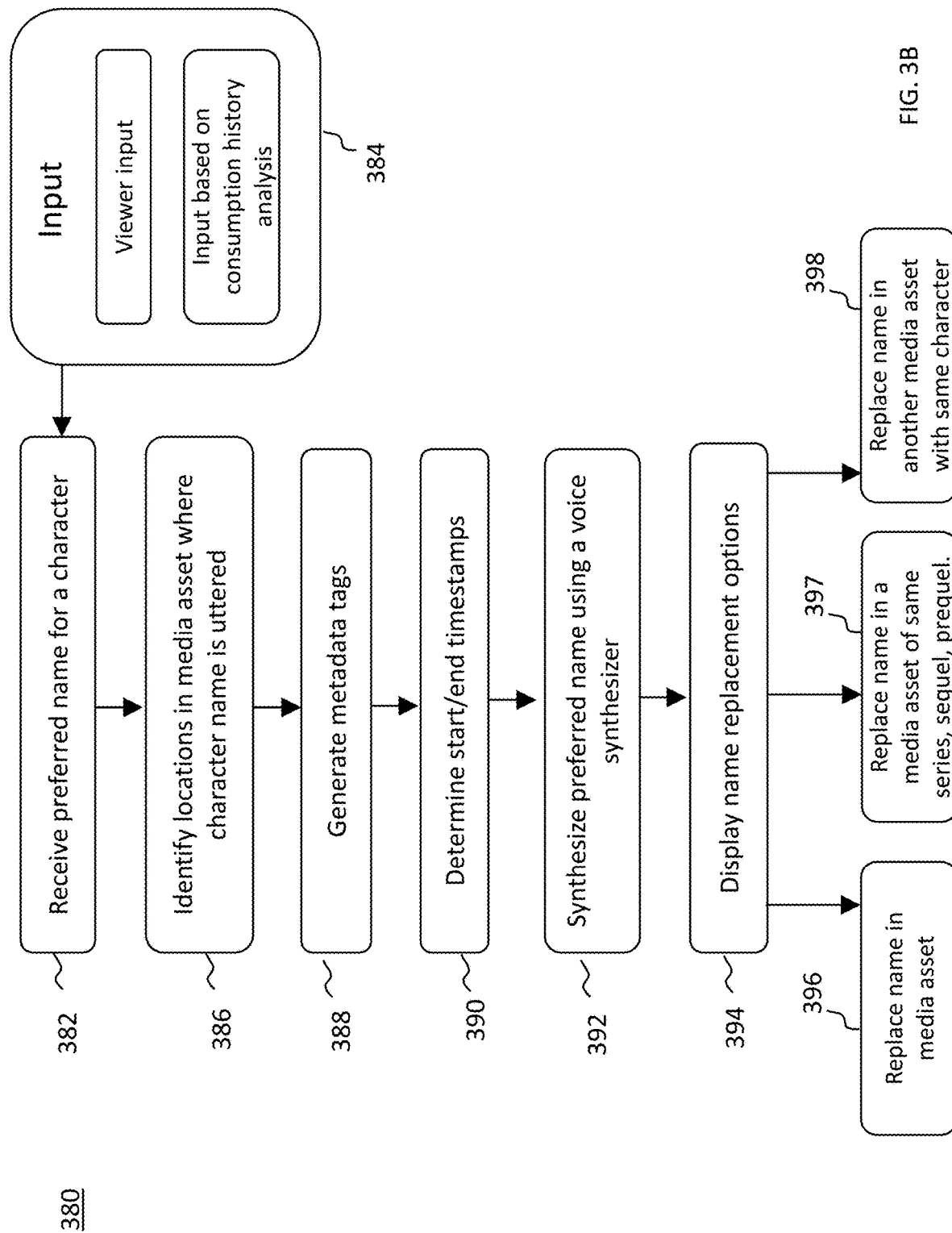
FIG. 3B is another flowchart of a process for replacing a character name in one or more media assets with a preferred name, in accordance with some embodiments of the disclosure.

In one embodiment, following the process of FIG. 3A or 3B, Jose may rename his favorite character "Jenny" to "Snow friend." Likewise, Laila may rename her favorite character "Ice Girl" and Stephanie may rename her favorite character "Super Jack" to a preferred name.

Since Ben and Laila both share a favorite character, Frosty, they may each name Frosty to their preferred name. For example, if Ben renames "Frosty" as "Ben," and Laila renames "Frosty" as "Laila," i.e., their own names, then the following display options may be used. In one embodiment, when Laila is watching the media asset while Ben is not watching, then the system may use Laila's preferred name for Ice Girl. Likewise, when Ben is watching the media asset while Laila is not watching, then the system may use Ben's preferred name for Ice Girl. In another embodiment, detecting a conflict of naming "Frosty," the system may provide options to select one of the preferred names and present the options to both Ben and Laila. In another embodiment, the system may poll all the members of the group watch to determine which name is to be used for replacing Frosty's name and rename Frosty based on a majority selection. Other variations to reach a consensus or an approval for Frosty's name are also contemplated.

Figure 5:
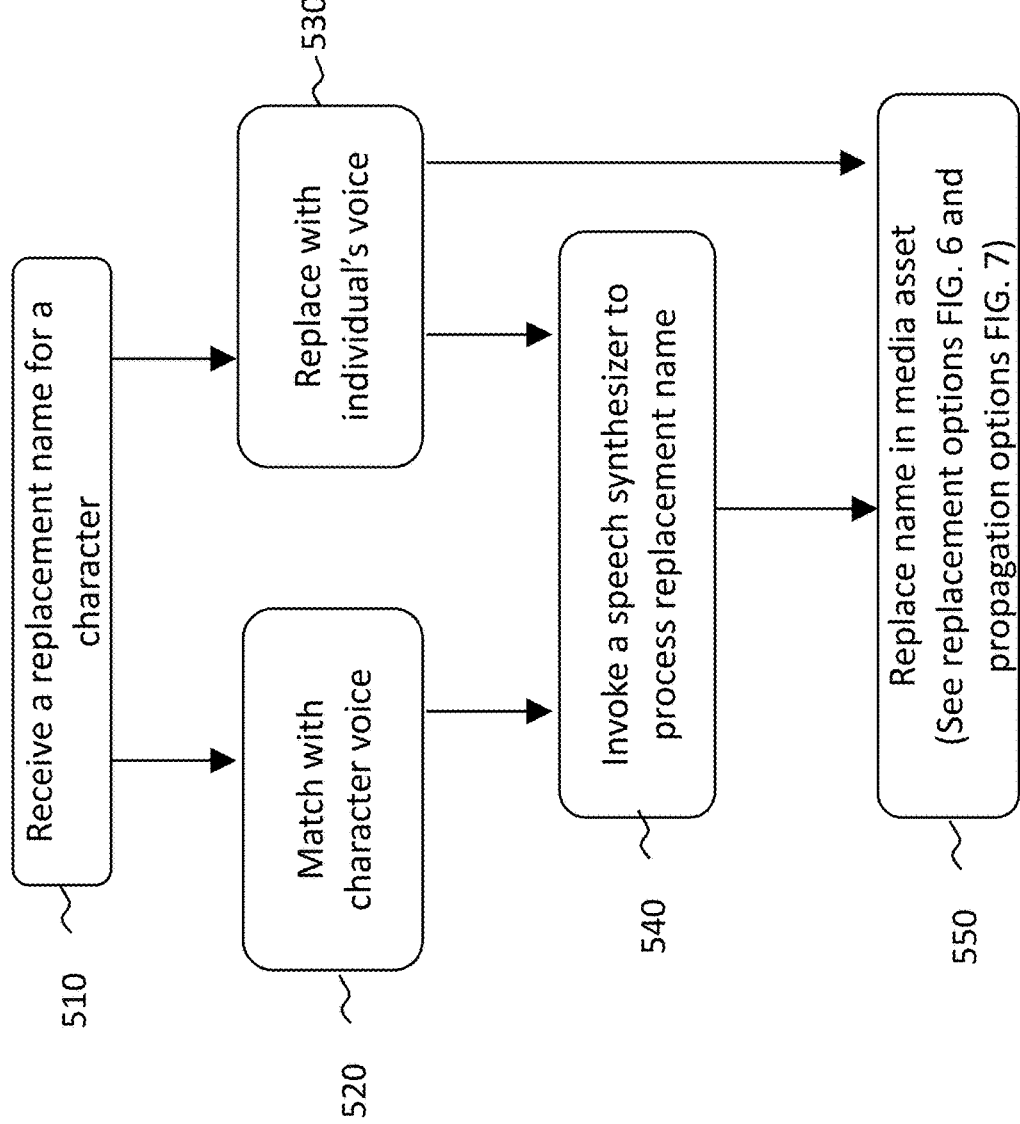
FIG. 5 is flowchart of a process for replacing a character name with a preferred name using either the character's voice or the viewer's voice, in accordance with some embodiments of the disclosure.

FIG. 5 is a flowchart of a process for replacing a character name in a media asset with a preferred name using either the character's voice or the viewer's voice, in accordance with some embodiments of the disclosure.

At block 510, a replacement name, also refer to as preferred name, provided by a viewer for a character in a media asset is received by the system. The system may use, in one embodiment, the process of FIG. 3A or 3B to analyze the preferred name and replace the character's original name by the preferred name.

In one embodiment, in block 520, the system may replace the character's original name by using the characters voice in the media asset. To match the preferred name with the character voice, the system may invoke a speech synthesizer at block 540 to process the replacement name.

The speech synthesizer may pre-process or normalize the uttered replacement/preferred name for the character. It may then determine all possible ways of reading and pronouncing the name and use AI to narrow it to a few appropriate and relevant choices. For example, the speech synthesizer may use the same tone, speed, volume, sentiment, and other related attributes from the character to determine how the character would pronounce the name.

The preprocessing by the speech synthesizer may involve cleaning up the uttered name or the text provided to ensure typos, mispronunciations, and mistakes are removed. Since each person has a different way to pronounce a name, the speech synthesizer may take samples of words uttered by the character and try to match the voice samples to phonetically match the new replacement name prior to replacing it and making it part of the media asset. In one embodiment, the speech synthesizer may use AI or statistical probability techniques, such as Markov Model™ or other neural network techniques to determine the most likely pronunciation of the replacement character name. It may also crawl various internet sources when the name is from a particular region or country to determine its correct pronunciation.

The synthesizer may also use homographs to contextually determine the meaning of the name or word to determine its pronunciation. Once the pronunciation is configured, the speech synthesizer may generate the speech sounds that make up the character name or words and access a dictionary of words and phonemes to look up the name or word and determine a corresponding phoneme. Alternatively, in another embodiment, the speech synthesizer may break the replacement name into their graphemes, which are written components units that break up a word into individual letters or syllables. The graphemes may then be used to generate corresponding phonemes and basically convert the text (speech converted to text or text input of the replacement name) to generate basic voice frequencies and use them when replacing the character's original name with the replacement name such that its pronounced properly and taken in the same manner as that of the character.

At block 550, the replacement character name (i.e., preferred name) that has been processed by the speech synthesizer may replace the original character's name in the media asset. The replacement may be performed based on propagation or name replacement options as describe further in FIG. 6.

Referring back to block 510, instead of voice matching the replacement name with the character's own voice, the system or the user may select an option to replace the character's original name with their preferred name in the individuals voice, as depicted in block 530. For example, a child renaming their favorite character may be provided an option to replace the character's name in the child's voice such that every time the character's name is used in the media asset, the voice of the child is used to utter the name.

In one embodiment, when replacing the characters original name with a replacement name in the child's voice, the system may provide an option to use a speech synthesizer in block 540 or keep the child's voice as it was uttered and replace the original name in the child's voice in the media asset. If a speech synthesizer is used, the child's voice may still be used but the tone, speed, sentiment, and other attributes of how the character utters the name in the media asset may be matched. For example, if in the media asset the name of the character is used in a loud angry voice in some instance, then the speech synthesizer would allow using the child's voice but enhance it such that it matches the tone of a loud angry voice. The user may be given an option whether or not to use the speech synthesizer when replacing the original name with the replacement name in the child's voice. If the speech synthesizer is not used, then the tone, speed, and all attributes of voice as uttered by the child will be used to replace the character's name by the replacement name.

In yet another embodiment, while a "stock" voice can be used, the original sound and pitch can also be maintained by cloning the original character's voice, or voice swapping, by creating a dedicated text-to-speech profile for every or any desired character in the video content and allowing the viewer, or the system, to select use of the profile in changing the voice. Such voice cloning, or voice swapping, techniques may rely on known digital signal processing (DSP) algorithms as well as deep generative modeling. The DSP algorithms and deep generative models may also be used to train a deep neural network that can be used to detect pattern and perform voice cloning and voice swapping tasks.

As referred to in this application, name, voice, dialogue, catch-phrase, statement are also referred to interchangeably or referred to as a factor or attribute of the character.

Figure 6:
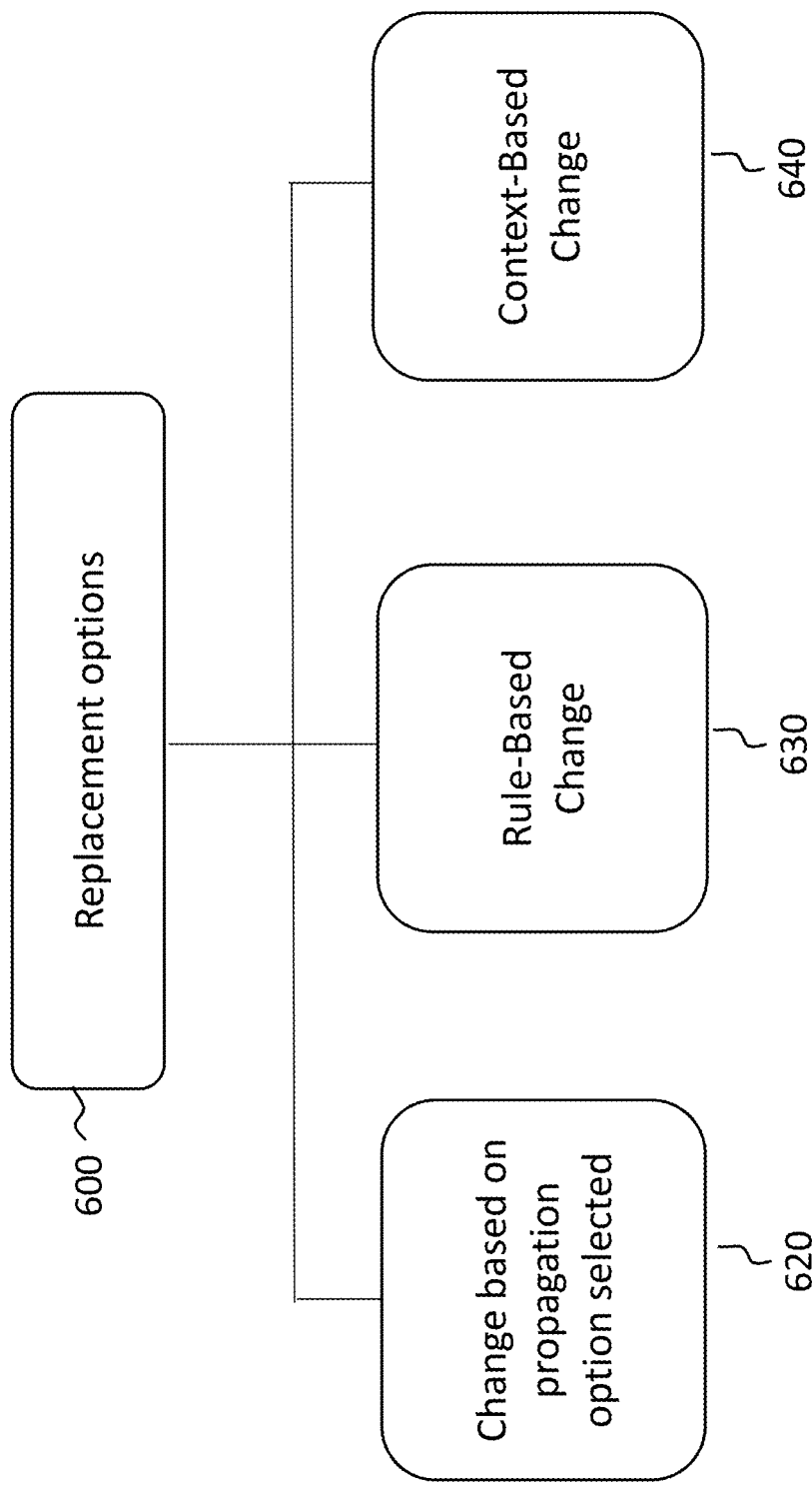
FIG. 6 is a block diagram of a plurality of name or voice replacement options, in accordance with some embodiments of the disclosure.

FIG. 6 is a block diagram of a plurality of name or voice replacement options, in accordance with some embodiments of the disclosure. The replacement of the character's original name with the preferred name, as described in one embodiment in FIGS. 3 and 5, may be performed based on the replacement options 600 provided in FIG. 6.

In one embodiment, the replacement of the character's original name, with the preferred name provided by the viewer, may be replaced based on propagation options selected in block 620. These propagation or name replacement options are further described in FIG. 7.

Figure 7:
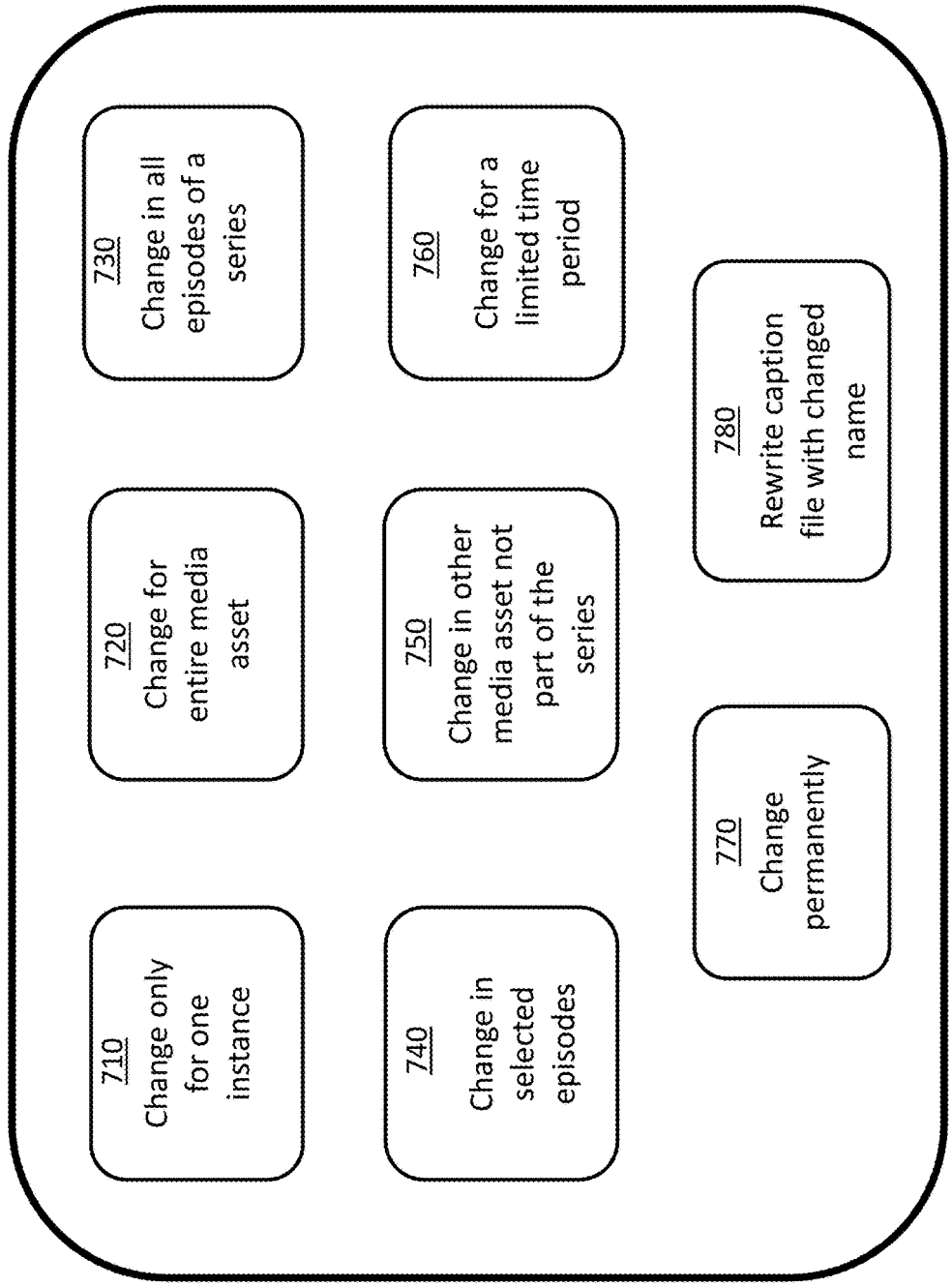
FIG. 7 is a block diagram of a plurality of name replacement options, in accordance with some embodiments of the disclosure.

FIG. 7 is a block diagram of a plurality of propagation options, in accordance with some embodiments of the disclosure. As depicted in FIG. 7, one of the name replacement/propagation options, as depicted in block 710, is to replace the character's original name by the preferred name only for one instance, or a particular instance. For example, a character may be shown in the media asset as winning an event, or performing a task, scoring a goal in a football game, or being involved in some important event and the viewer may want the preferred name, which in some embodiments may be the viewer's name, mentioned only during the important event. Alternatively, the viewer may select any one instance/play position or locations in the media asset where the characters original name is to be replaced by their preferred name.

In another embodiment, as depicted in block 720, one of the propagation options is to replace the characters original name by the preferred name universally for the entire media asset. This means that for every instance in the media asset where the name of the character is used, it will be replaced with the preferred name given by the viewer.

In another embodiment, as depicted in block 730, another one of the propagation options is to replace the characters original name by the preferred name not only in the current media being displayed, but also for all episodes of the same series. As such any time the name of the character is used, whether in the current episode or another episode of the series, the character's original name will be replaced with the preferred name given by the viewer. In order to accomplish such a change in other episodes, in one embodiment, to change the original name in other episodes of the series, the system may obtain the caption file of all the other episodes and determine all occurrences in the other episodes where the character's name is mentioned. The system may then replace the caption file of all the other episodes with a new caption file that includes the replaced name.

In another embodiment, as depicted in block 740, one of the propagation options is to replace the characters original name by the preferred name in the current media being displayed and one or more selected episodes of the same series. The user may be provided an option to select the one or more episodes in which the user desires the character's original name to be replaced. The system may obtain the caption files for the selected one or more episodes and replace the caption files with the character's name replaced with the preferred name. Likewise, As depicted in block 750, the viewer may also select a plurality of media assets that are not part of the same series, such as media assets in their library or database, and direct the system to replace the character's name with the preferred name.

In yet another embodiment, as depicted in block 760 of FIG. 7, one of the propagation options is to replace the character's original name by the preferred name for a limited time. In this embodiment, the system may set a timeframe after the expiration of which the replaced name may be switched back to the original character name. Alternatively, the system, as depicted in block 770, may permanently make the change from the original name to the preferred name in the media asset.

In another embodiment, as depicted in block 780, in any of the options 710-770, the system may rewrite the caption file such that the character's name is replaced in the rewritten caption file from its original name to the preferred name.

Referring to FIG. 6, one of the replacement options 600 may include a rule-based change or replacement option 630, as further described in FIG. 8.

FIG. 8 is a table of rule-based name or voice-replacement options, in accordance with some embodiments of the disclosure. In this embodiment, the system may implement a rule-based replacement option to replace the original name of the character to a preferred name based on matching one or more replacement rules.

As depicted in table 800, in one embodiment, a rule can be to replace the character's original name based on which other character in the media asset is addressing the character. For example, a character's name in the media asset is Michael. Other characters in the media asset may be named John, who is Michael's father, Sally, who may be Michael's mother, Robert, who may be Michael's older brother, Jennifer, who may be Michael's sister, and Paul, who may be Michael's friend.

Continuing with the above embodiment, if a rule is implemented that replaces the character's original name based on which other character in the media asset is addressing the character, then, as depicted in table 800, if John (Dad) is addressing Michael then the replaced name for Michael may be "Son." Likewise, if Sally is addressing Michael, then the replaced name for Michael may be "Cutie," if Robert is addressing Michael, then the replaced name for Michael may be "Bro," if Jennifer is addressing Michael, then the replaced name for Michael may be "Mikey," and if Paul is addressing Michael, then the replaced name for Michael may be "Bestie."

Referring to FIG. 6, one of the replacement options 600 may include a context-based change or replacement option 640 as further described in FIG. 9.

FIG. 9 is a table of context-based name or voice replacement options, in accordance with some embodiments of the disclosure. In this embodiment, a character name may vary depending on the context and sentiment of the dialogue with another character. For example, as a character's name in the media asset is Michael. Other characters in the media asset may be named John, who is Michael's father.

In one or more scenarios in the media asset, John may be addressing Michael in different contexts. For example, John may be addressing Michael when John is being playful, being angry at home, or in school. For each separate scenario, John may refer to Michael with a different name, such as "Buddy," when playful, "Mikey," when angry, "Son," at home and "Michael" at school. Other name alternatives may also be used by John when in private vs when in public when John addresses Michael.

The system may allow such context-based rules to be created such that the original name may be replaced with a preferred name based on the setting and context in which it is being addressed. Although some examples and combinations of rules and contacts are provided in FIGS. 8 and 9, the system may allow the viewer to develop any other rule or context for determining which preferred name should be used based on what other character is addressing their favorite character or based on context in which they are being addressed.

Figure 10:
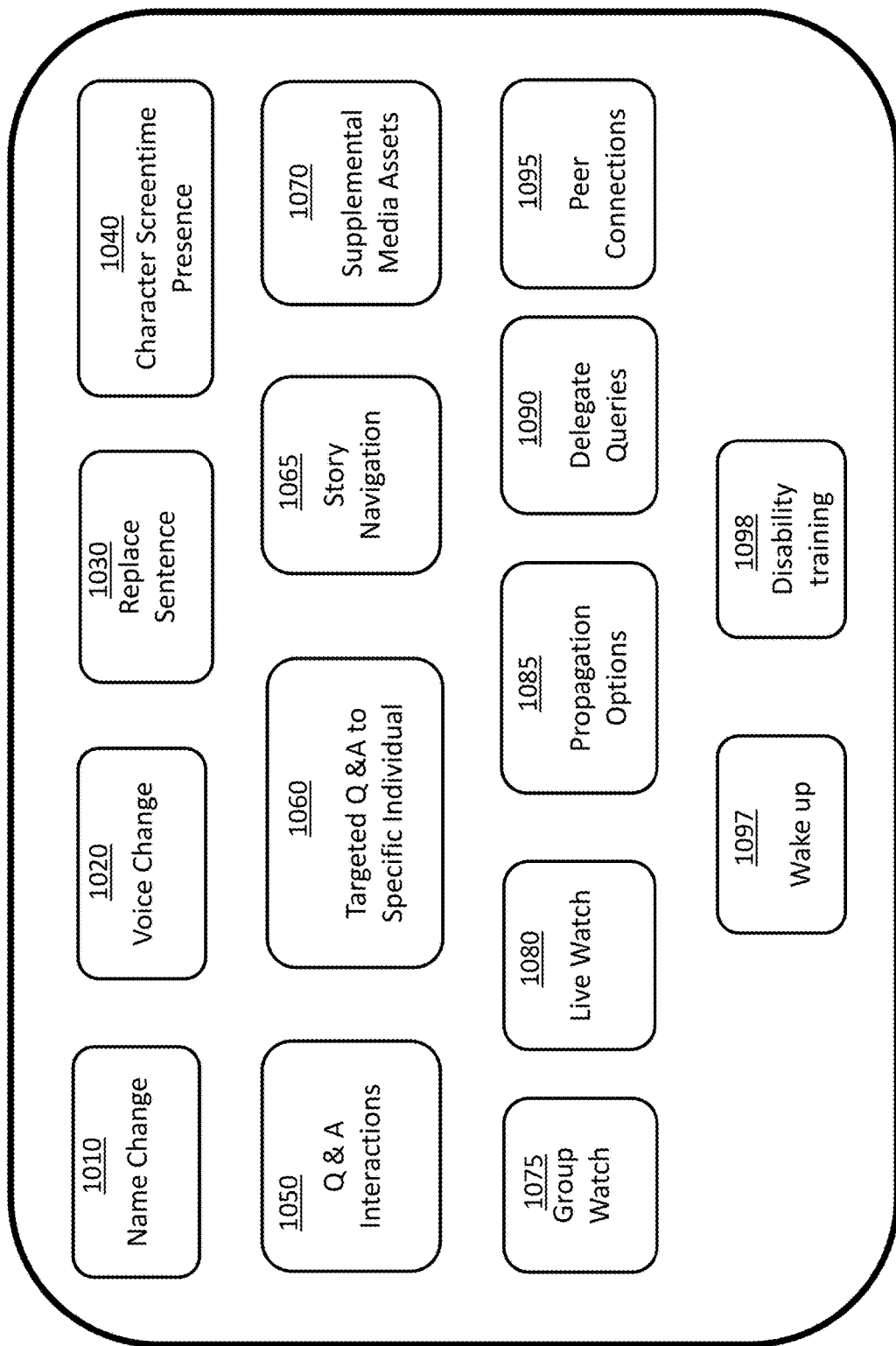
FIG. 10 is a block diagram of a plurality of features of the interactive system, in accordance with some embodiments of the disclosure.

FIG. 10 is a block diagram of a plurality of features of the interactive system, in accordance with some embodiments of the disclosure. The plurality of features 1010-1085 may use similar processes, such as processes described using FIGS. 3A, 3B and 5, or implemented using systems and devices described in FIGS. 1-2.

As depicted in block 1010 of FIG. 10, the interactive system, such as the system of FIG. 1, allows a viewer to change the name of a character to a preferred name. Processes and options presented in FIGS. 3A-9 may be used in changing the original name of the character in the media asset to the preferred name.

Similar to changing the name, the interactive system, as depicted in block 1020, may allow the viewer to change the voice in which the character name is taken in the video asset. For example, the interactive system may allow the viewer to either use the character's voice or their own voice when their favorite characters name, which is changed to their preferred name, is addressed in the media asset. As discussed in FIG.

5, a speech synthesizer may be optionally used when replacing the name and using either the character's voice or the viewer's voice.

As depicted in block 1030, the interactive system can be used to replace a word, sentence, or a catchphrase, uttered by a character in the media asset. Processes and options presented in FIGS. 3A-9, which were used to describe name change or voice change, may also be used to change/replace a word, sentence, or the catchphrase in either the character's voice or the viewer's voice.

In one embodiment, the system allows the viewer to recite a whole sentence (dialogue) associated with their favorite character in the video content. For example, a famous catch-phrase that the chosen characters continually repeat throughout the children's program Paw Patrol™ is: "No job is too big, no pup is too small." Other phrases in the same program include: "PAW Patrol, to the Lookout," "PAW Patrol is on a roll, and "PAW Patrol to the rescue." The viewer may record these catch phrases in their own voice and have the original character's voice be replaced by their recorded voice. as such, whenever the catch phrase is uttered in the media asset, the viewer's voice recording is used instead.

In another embodiment, dedicated speech to text profile may be developed. In this embodiment, the system may allow a viewer to use their own voice to recite a whole sentence (dialogue) or catch phrase associated with their favorite character. The recited speech may be converted from speech to text and the text may be used for in the video content such that the recited phrase is matched with the video content.

As depicted in block 1040, in one embodiment, the interactive system may determine the presence of a character in the media asset based upon its viewer's presence. For example, if a particular viewer selects their favorite character to be a character named "Michael," then, if the particular viewer is offline, i.e., not active or not actively watching, or their IP address does not ping back as active, then the system may either eliminate or minimize the screen time for Michael while the associated particular viewer is offline. By doing so, the interactive system may increase the screen time for other characters whose associated viewers, i.e., the viewers who selected the other characters as their favorite character, are online. Such increase in screen time for characters whose viewers are active and decrease in screen time for characters whose viewers are not active provides a higher level of engagement for the active viewers.

In some instances, Michael may be integral to the story of the media asset, particularly to a segment, and in other instances Michael may be replaceable with another character or not needed altogether. The interactive system using AI may determine whether Michael is integral to the story and accordingly adjust Michael's screentime if a viewer who has selected Michael as their favorite character is offline. For example, for segments in which Michael is integral to the story, the interactive system may continue to display Michael even though the associated viewer is offline, and in segments where Michael is not integral to the story, the interactive system may remove or minimize the amount of screen time for Michael when the associated viewer is offline.

Figure 11:
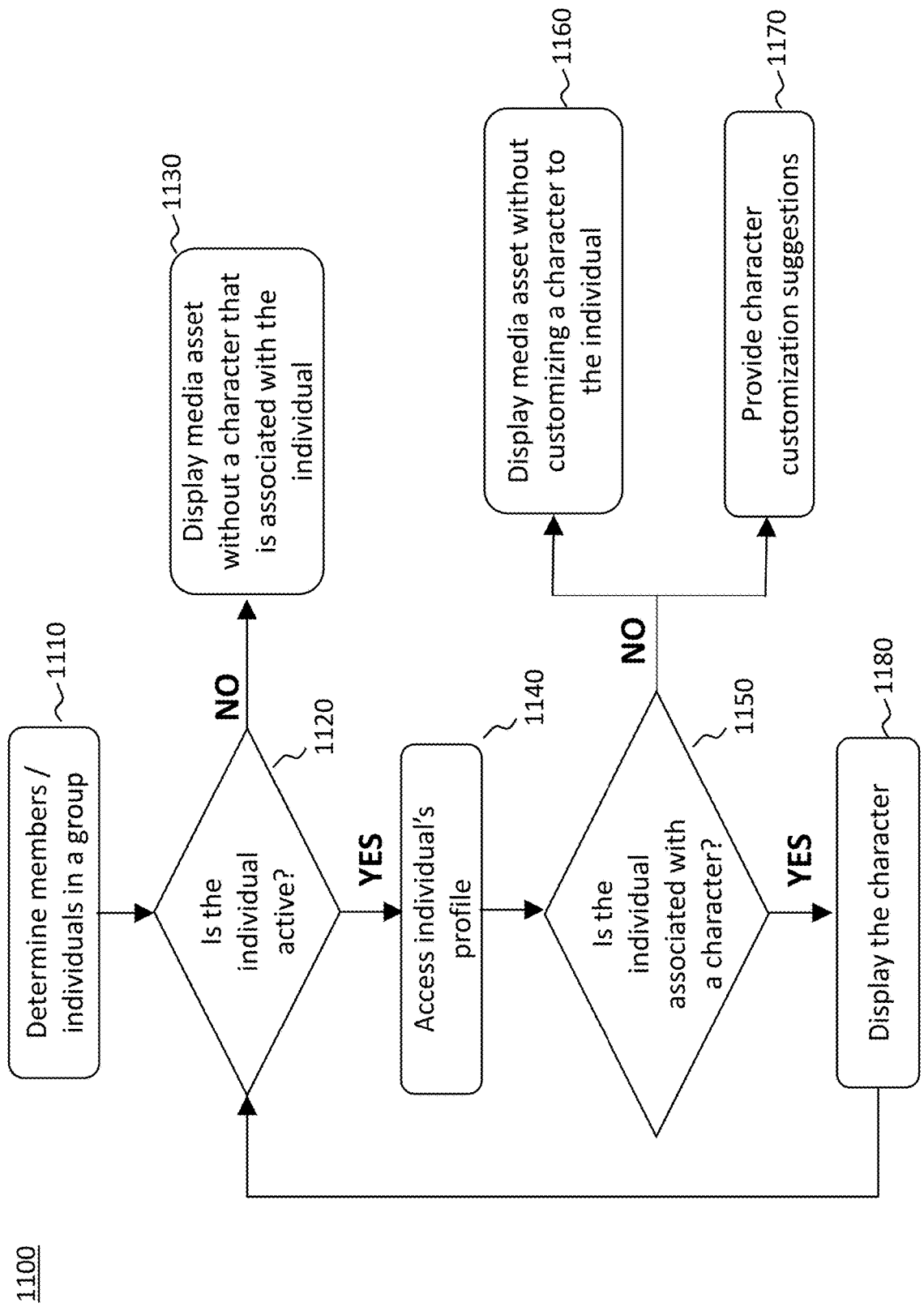
FIG. 11 is a flowchart of a process to determine viewer active status for determining an associated characters screen time, in accordance with some embodiments of the disclosure.
Figure 12:
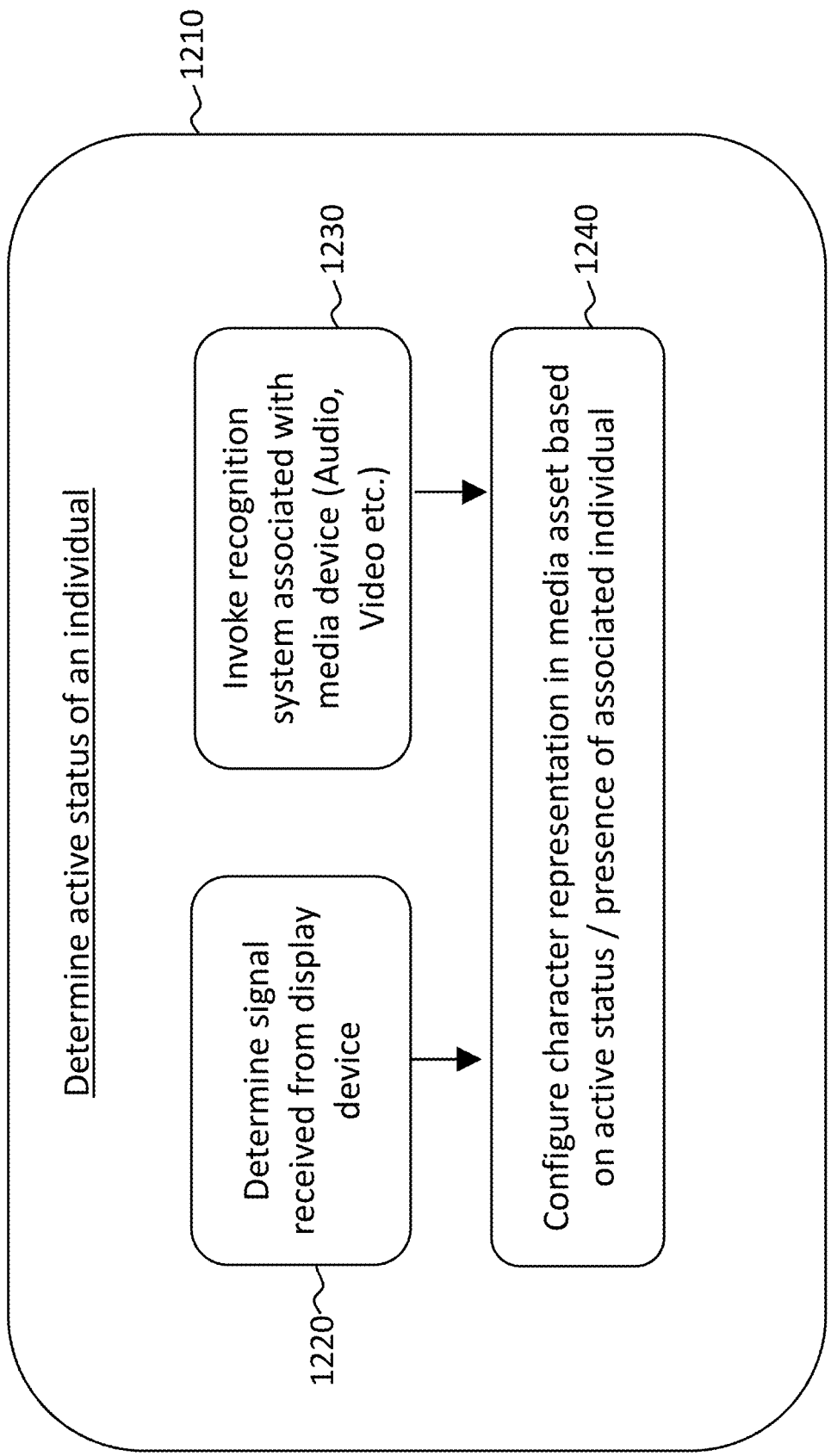
FIG. 12 is flowchart of a process to determine viewer active status in a group-watch and a live-watch setup, in accordance with some embodiments of the disclosure.

Determining whether an associated viewer is active or online is further described in FIGS. 11 and 12. FIG. 11 is flowchart of a process to determine viewer active status for determining associated character's screen time, in accordance with some embodiments of the disclosure. In one embodiment, the process of FIG. 11 may be applied in a group-watch setting where different members of a defined group watch the media asset from different display devices or different locations.

At block 1110, the interactive system determines the members and or individuals in a group watch. As described earlier, a group watch may be created by an individual and authorized members may be added to the group such that all the members can watch a media asset at same or different times and interact with each other. An individual is also interchangeably referred to as a viewer, user, or a member of a group watch.

At block 1120, the active or online status of a member of the group watch is determined. Determination of active status is further described in FIG. 12, which is flowchart of a process to determine viewer active status in a group-watch and a live-watch setup, in accordance with some embodiments of the disclosure.

In FIG. 12, in one embodiment, at block 1210, two options are presented for determining the active status of an individual. One option refers to determining the active/online status in a group-watch setting (block 1220) and another option refers to determining the active status in a live-watch setting (block 1230).

At block 1220, which refers to a group-watch setting where members of a defined group may watch a media asset, the interactive system receives a signal from a display device off its online/active status. For example, in one embodiment, a member of the group watch may have their television, mobile phone, tablet, or any other display device, turned ON and may be watching the media asset. Accordingly, the interactive system may receive a signal from the display device being used by the viewer indicating that the media asset is being displayed. Likewise, if a signal is not received, the system may determine that the display device is not turned on and the media asset is not being watched therefore associate that with the member being inactive at the time. In another embodiment, the interactive system may periodically ping electronic devices associated with members of a group watch to determine their active status.

Figure 13:
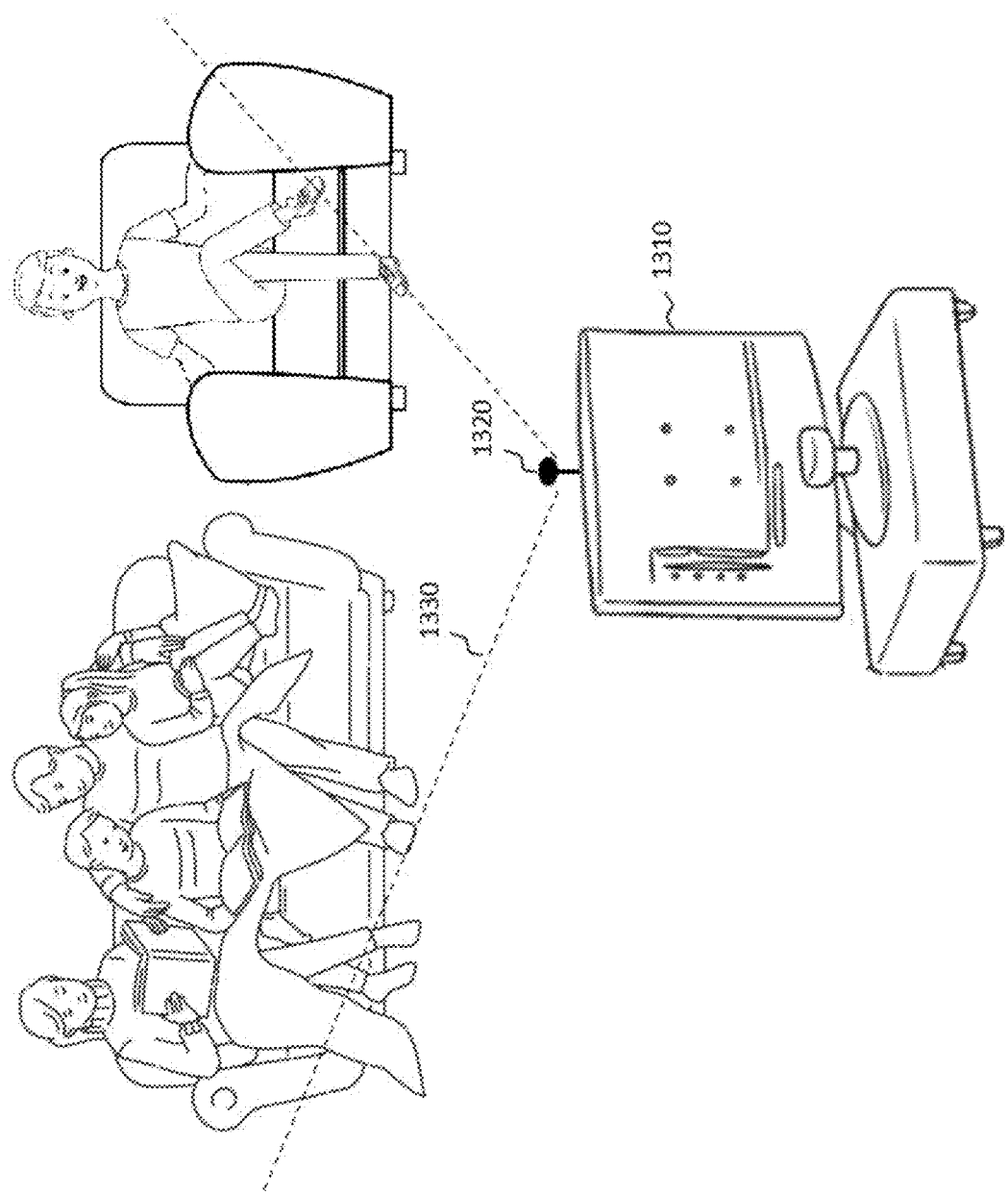
FIG. 13 is a block diagram of a device on which a plurality of users are consuming a media asset in one room, in accordance with some embodiments of the disclosure.

At block 1230, which refers to a live-watch setting where a plurality of individuals are watching the media asset together, the interactive system may use audio, video, and other sensing equipment associated with the media device on which the media asset is being watched. Since the individuals are watching the media asset on one device, such as the device in FIG. 13, the interactive system may use the media device's audio or camera to determine which individual is present in the room. For example, in one embodiment, the multiple users that are consuming a media asset may include a plurality of adults and children in the same room. The interactive system may activate the media device 1310 camera 1320 and capture an image within the field of view 1330 of the camera 1320. The system may perform image analysis and use AI algorithms to determine which individual is present in the room while the media asset is being displayed. For example, the system may use facial recognition and match the faces with stored profiles of an individual to associate the individual with their profile. The system may also perform audio analysis to associate speech uttered in the room with an audio signature stored in the profile to associate the individual on the basis of their audio profile. Based on audio, camera, or other input, the system may determine which individual is active.

Whether the active status is determined using block 1220 for a group-watch setting or using block 1230 for a live-watch setting, once a determination is made of the active status of an individual, the interactive system may configure and align the character's screentime/presence based on the active status of the individual who has, for example, selected the character as their favorite character, renamed the character with a preferred name, or changed the voice of the character to their own voice for a catch-phrase.

Referring back to FIG. 11, if an individual associated with a character is not active, then at block 1130 the media asset may be displayed without a character associated with the individual that is not active, or the characters screen time may be minimized. The character's role, i.e., whether it is integral to the story, may be determined prior to not displaying, or minimizing the display, of the character.

In one embodiment, once an individual's active status is determined at block 1140 of FIG. 11, an association between an active individual and their favorite or associated character in the media asset may be made by accessing their profile and determining if the individual has selected the character as their favorite character, or for example, renamed the character with a preferred name, or changed the voice of the character to their own voice for a catch-phrase, as depicted in blocks 1140 and 1150.

If a determination is made at block 1150 that the individual is associated with the character, then at block 1180, the character is display. If a determination is made that an active member of a group watch has not identified a favorite character, or not renamed the character with a preferred name, or changed the voice of the character to their own voice for a catch-phrase, then at block 1160, the interactive system may display the media asset without customizing a character to the individual. Alternatively, at block 1170, the interactive system may provide suggestions for the individual to customize a character to their liking. The customization suggestions may be based on an AI analysis of the individual's prior consumption history.

Referring back to FIG. 10, block 1050 and 1060, the interactive system may present questions and queries either generally to all the viewers or target a specific viewer to answer a question. The interactive system may also direct a question that is addressed to a specific character in the media asset two of you are associated with that character, i.e., a character that was identified as preferred or favorite by a viewer. Additional details of presenting a question or a query and seeking a response are described below in relation to the description of FIGS. 14 and 15.

As depicted in block 1065, in another embodiment, the interactive system can be used to navigate a story to one of a plurality of predetermined paths based on a response to a query or a statement or choice made by a viewer.

As depicted in block 1070, in another embodiment, the interactive system can be used to access supplemental media assets to assist the user in responding to question or query presented by the system. To search, curate, and provide access to such supplemental media assets, the interactive system may use a search template and processes that are further described in FIGS. 15-17. Such supplemental media assets may be used to provide a background or understanding to the viewer such that they may further learn about the topic of the query or review the supplemental media asset to properly respond to the query presented.

As depicted in blocks 1075 and 1080 (and 1040), in another embodiment, the interactive system can be used to create a different group of members such that they can watch a media asset together either at the same time or other preferred times. The interactive system may also be used to determine which individuals are actively consuming the media asset whether they are watching it all together in one room or watching it as a group watch separately in different locations having different IP addresses.

With respect to block 1075, which is a group-watch setting, a user, or the system, may define a group of members that wish to consume the media asset or a plurality of media assets together. When a viewer is selecting the members, a message may be sent to a potential member to approve a "Join" request and become part of the group watch. In another embodiment, the system may also suggest potential members for a group watch based on social media, messages, and other interactions between a viewer and others that suggest a common interest.

In one embodiment, in a group-watch setting where viewers in the same group are watching on different devices in the same vicinity or if they're remote from each other, then characters can query specific viewers for answers. For example, viewer A's favorite character might ask user A to assist the character in a counting chore (e.g., counting the coins), and viewer B's favorite character can query user B. Both users can hear each other's answers.

In one embodiment, user A's favorite character can also engage user B to make the interaction more social. For example, user B can be asked to confirm the count, etc. All such different scenarios can be predefined in templates and models that are associated with specific video segments and invoked via dedicates sections of the video's manifest file. For example, the templates (questions, answers, etc.) are separate documents (e.g., JSON files) that are associated with specific portions of the content. In one embodiment, the flow of the video is adaptive and as more users that are associated with same group start to watch the same video (e.g., same episode of SpongeBob), then the new viewer is also queried for help by his favorite character(s). Similarly, the plot of the video changes as users associated with certain characters join and/or leave a viewing session, including removing or reducing the appearance of characters associated with users who are not presently watching the content.

The establishment and management of the group-viewing session can be coordinated by a dedicated service and monitored, for example, the service may monitor when a new user joins a group and when a user leaves the group, to signal to the media device and the general communication flow which characters/associated users are still part of the viewing session. In another embodiment, when a user is no longer watching the video, their favorite character would not query them and, in such instance, the original video segment(s) (back-up segments) can be played.

As depicted in block 1085, in another embodiment, the interactive system can be used to determine which propagation options are to be used to propagate the name changes, voice changes, story navigation changes, or any other changes made by the viewer to currently being consumed media asset or other media assets. Additional details relating to propagation options are described in relation to the description of FIGS. 6 and 7.

As depicted in block 1090, in another embodiment, the interactive system can be used to delegate the queries associated with a character to the remaining users that are still viewing the content if the viewer associated with the character is offline.

As depicted in block 1095, in another embodiment, the interactive system may use a "RTC Peer Connection" interface. Connections may be established via WebRTC so that two different applications on two different devices (remote or in the same vicinity) can communicate using a peer-to-peer protocol. The establishment of an asynchronous communication channel the process for initiating a peer connection (e.g., via the RTC Peer Connection object), and control of a connection between two peers is well defined in the WebRTC standard and can be relied upon.

Alternatively, in another embodiment, during a unicast session (e.g., excluding group watch), a customized manifest file can be generated for the user where the modified content (i.e., segments) are pre-generated before playback or during playback (e.g., as the video progresses). The services described above (e.g., dubbing service, transcription service, etc.) will allow for the modification of the content and serve as input the to the customized playlist/manifest generation service.

As depicted in block 1097, in one embodiment, the interactive system may include a "wake up" feature that can be used to track a viewer's attention and produce one or more alerts when lack of attention is detected. In this embodiment, a viewer may be consuming the media asset on a media device that includes a camera. The system may use the media device's camera to track the viewer's gaze and determine if the viewer's line of sight is focused on the media device. The system may use an AI algorithm to determine the viewer's focus and may disregard an occasional turning of the gaze away from the media device or blinking of an eye. In one embodiment, the camera of the media device may track the viewer's eye movement to determine whether the amount of eye movement and the direction of eyeballs can be considered as the user is paying attention to the display of the media asset. The camera may also determine body language and movement and such data may be analyzed by the AI algorithm to determine whether the viewer is focusing on the media asset.

In one embodiment, in response to determining that the viewer is not focused on the media asset, the system may invoke the "wake up" feature of the system and provide one or more alerts to regain the viewer's focus. For example, the system may flash certain colors or pop up messages on the display screen to gain the viewers' attention.

In another embodiment the system may produce certain sounds to gain the viewer's attention. These may be certain types of tones, whistles, or human or character voice.

In yet another embodiment, the system may specifically call out the viewer by his or her name. The system may repeatedly call their name at a certain frequency till they respond.

In another embodiment, the system may have the viewer's favorite character direct a question specifically to the viewer. The character may address the viewer in the character's voice or the viewer's voice that the viewer may have programmed or accepted previously. Having their favorite character ask them a question or say their name or catch phrase may be a way to get their focus back to the media asset.

In yet another embodiment the system may repeatedly take the viewer's name or use words like "look here," "look here," "Michael look here," "hey," or any other wake up word to gain the viewer's attention. The "wake up" words may be selected by the system, the viewer, or a caretaker or parent of the viewer.

In another embodiment, the system may be connected through wireless means to other equipment and devices in the same room where the viewer is consuming the media asset. The system may use such equipment and devices to alert the viewer and attempt to regain the viewer's focus towards the media device. For example, if the viewer is looking away from the display device and engaged with a mobile phone, the system may send an alert on the mobile phone for the viewer to refocus to the media device.

As depicted in block 1098, in one embodiment, the interactive system may include a disability training feature. This feature may be used to assist an individual with a specific type of learning that may be prescribed by their caretaker or a physician. For example, the disability feature may be used for an autistic child who may respond only to a certain set of names or feel comfortable only with a certain set of names, such as their family names. As such, the system may automatically change all the character names to names that may make the autistic child feel comfortable and not threatened. Alternatively, the system may allow the child or their parent and caretaker to change the name of characters as desired.

The disability feature may also be used to teach an individual a certain life skill. For example, the disability feature may be used to train an individual with speech impediment to repeat certain types of sentences. In another embodiment, the disability feature may be used train an individual to a certain motor skill by having their favorite character perform the motoring skill in the media asset. The system may then monitor the individual through a camera of the media device to determine if the individual is properly performing the life skill being taught.

The disability feature may also be used for individuals suffering with attention deficit disorder (ADHD or ADD), Alzheimer's, or other physical or mental disabilities. The disability feature may also allow the viewer, or their caretaker, to create a customizable experience that may be familiar to the individual suffering from a certain disability such that they feel more comfortable in interacting with a familiar name or a familiar character to perform learn a skill.

In one embodiment, the disability feature may also allow the viewer, or their caretaker, to create a step by step program that may allow the used to achieve a certain level and then move to a higher level for learning a skill. The system may also gamify such learning activities to make it more entertaining to the viewer by using their favorite character whose name and voice may be replaced as desired by the viewer.

Figure 14:
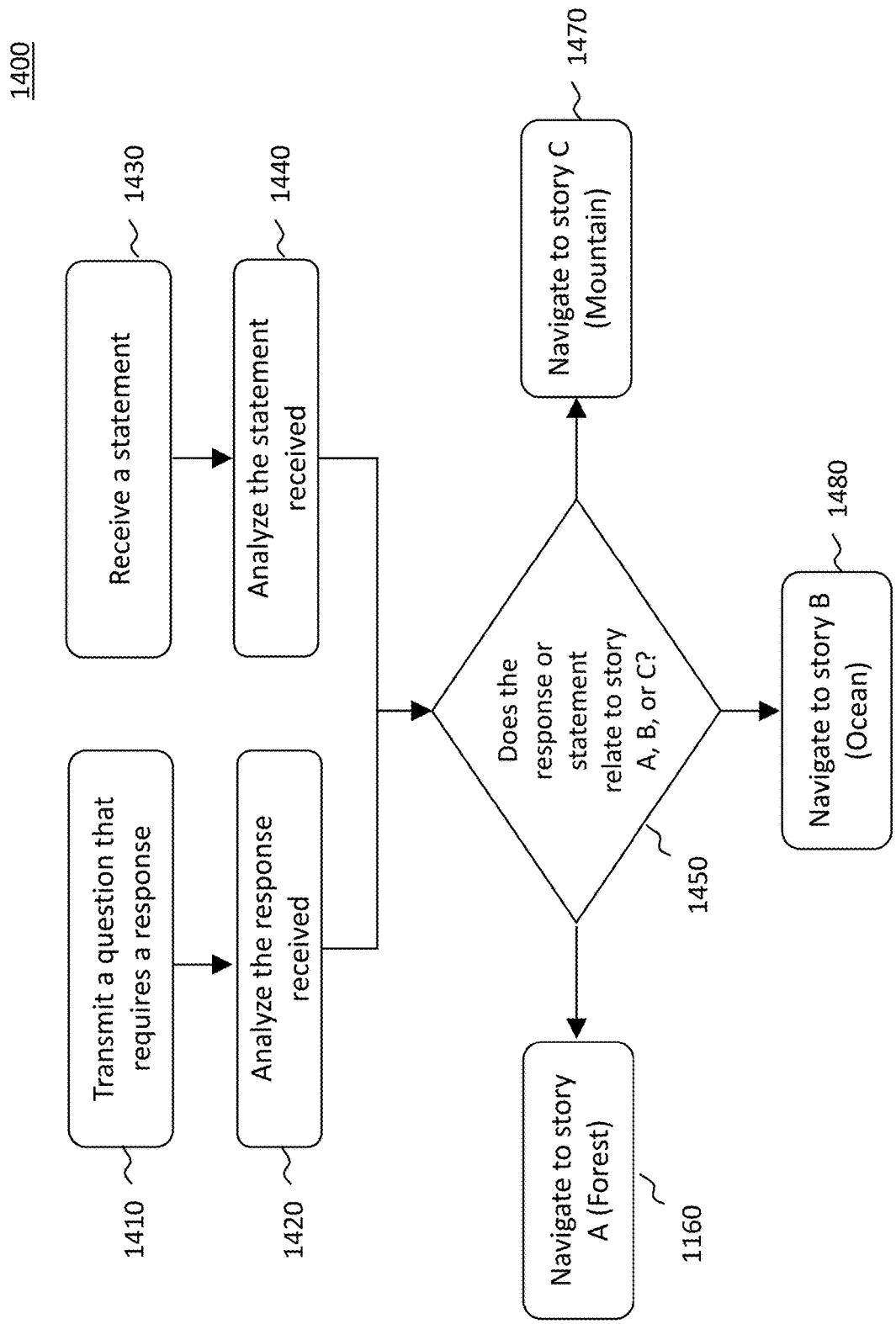
FIG. 14 is a flowchart of a process of navigating the story in a direction based on the selections made or responses provided by the viewer, in accordance with some embodiments of the disclosure.

FIG. 14 is flowchart of a process of navigating the story in a particular direction based on the selectins made or responses provided by the viewer, in accordance with some embodiments of the disclosure.

In one embodiment, the interactive system, such as the system depicted in FIG. 1, at block 1410, may transmit a question/query to a viewer of the media asset. The interactive system may seek a response to the question presented. The viewer may also be prompted for a response by automatically activating a speech recognition engine and monitoring an audio input from the viewer.

In one embodiment, the question/query transmitted to the viewer may relate to an education topic and require the individual to solve a math problem or provide an answer solving another type of problem to develop the individual's skill set. For example, the system may display different denominations of coins and ask the individual, such as a child, to add all the denominations of the coins and provide a total aggregate count of the coins thereby testing the child's math skills. In another embodiment, the system may ask a question which may have a plurality of acceptable answers, such as, it may present a scenario and ask the child what you would do in this situation looking for any type of answer that may be accepted by the system. In yet another embodiment, the system may ask job related questions to an employee to seek their answer. The system may also be used for various adult education and seminars to pose queries to the viewer to determine their understanding of the subject matter presented.

At block 1420, the interactive system may analyze the response to the question received from the individual. The interactive system may invoke AI algorithm to determine if the answer is satisfactory.

Instead of asking a question, the interactive system may receive a statement at block 1430 from an individual viewing the media asset. At block 1440, the interactive system may invoke an AI algorithm to analyze the statement received.

In yet another embodiment, the interactive system may ask a question, or receive a statement, such as through blocks 1410 and 1430, and the response or the statement may be analyzed to determine the path of a story. For example, the system may include a plurality of predetermined paths to navigate the story. The system may analyze the response or the statement at block 1450 to determine which of the predetermined path to navigate based on the response provided by the individual.

For example, in one embodiment, the interactive system may include three predetermined paths to a story. The interactive system may display a story in which the character needs to decide on which adventure they are going to embark on. It may present a plurality of paths that are associated with a different type of adventure, such as path A, which may lead the story to a forest, path B which may lead the story to an ocean, and path C, which may lead this story to a mountain. Depending on the viewer's response to the question presented, or viewer's statement made, the interactive system may navigate the story such that the character embarks on a journey to a forest (as depicted in block 1460), an ocean (as depicted in block 1480), or a mountain (as depicted in block 1470). Although an exemplary story and a path have been depicted in FIG. 14, other examples, such as in-workplace, employment, or work or collaborative team setting are also contemplated. For example, the system may seek certain design input from an engineer, and based on the input provided, the design may take on a certain direction and path.

Figure 15:
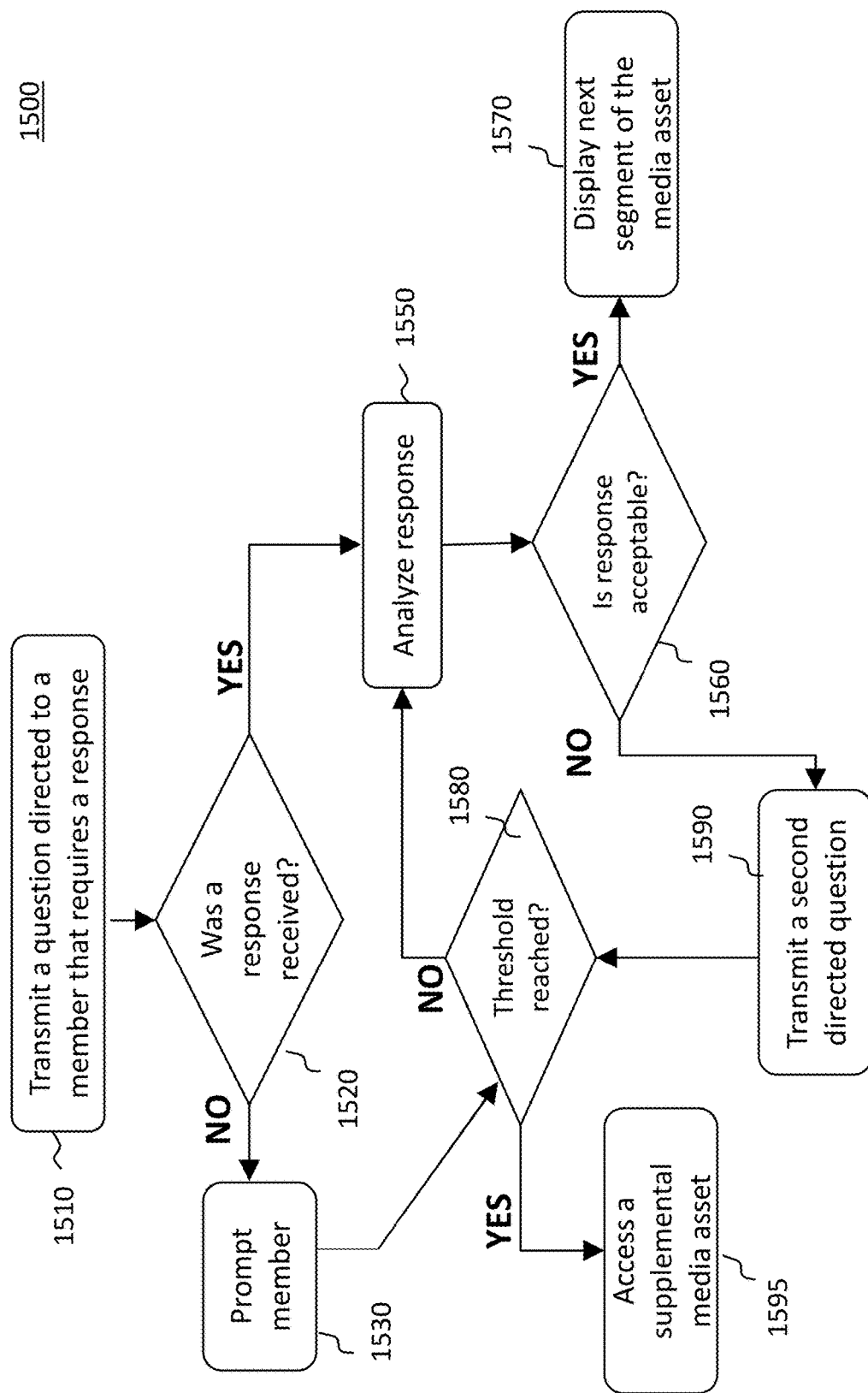
FIG. 15 is a flowchart of a process to transmit questions to the viewer and obtain supplemental videos as needed, in accordance with some embodiments of the disclosure.

FIG. 15 is flowchart of a process to transmit questions to the viewer and obtain supplemental videos as needed, in accordance with some embodiments of the disclosure. In one embodiment, the process of FIG. 15 may be applied in a group-watch setting where different members of a defined group watch the media asset from different display devices or different locations having a different IP address.

At block 1510, the interactive system transmits a targeted question to a specific member of the defined group, such as a group watch described in FIG. 10, seeking a response.

At block 1520, the interactive system determines if a response is received for the targeted question that was directed to a specific member of the watch group. In one embodiment, the system may not accept the response from any other member of the watch group and seek the response only from the member to whom the question was directed.

At block 1530, if a response is not received from the member of the watch group to whom the question was directed, the interactive system may prompt the member multiple times until a threshold number of prompts are reached (such as in block 1580). The system may also access a supplemental video to aid the member in responding to the directed question.

At block 1550, if a response was received, the interactive system analyzes the response and determines whether the response is acceptable at block 1560. In one embodiment, to determine whether the response is acceptable, the interactive system may utilize an AI algorithm. In another embodiment, the interactive system may include a plurality of predetermined responses. When a response is received, the interactive system may compare the response with one of the predetermined responses to determine a match. If a match occurs, the interactive system may determine that the response provided is acceptable.

In another embodiment, the response may be an audio input. If an audio input is received, then the input such as a count (5 coins) can be compared to an expected answer, in which case a corresponding reply can be used (e.g., Oh you're right). Such feature relies on pre-existing files (e.g., a flow model file) that can be used to control the flow of the video (e.g., allow the viewer to retry counting the coins) or playing an additional segment where the actual character counts the coins, etc.

At block 1590, if the provided response is not acceptable, then the interactive system may transmit a second directed question to the same member of the watch group to home the original question was directed. The system may determine the non-acceptable response to mean, in one embodiment, that the member has not properly understood the question, or is having difficulty in answering the question. As such, the second question may be a clarifying question that is a follow up to the first question.

The interactive system may analyze the response to the second question at block 1550 and determine if the answer is acceptable. If the answer is not acceptable, the system may perform the repeated action of blocks 1550, 1560, and 1590 to a desired threshold number of times, as depicted in block 1580, after which the interactive system may access a supplemental media asset at block 1595. The interactive system may provide a link of the supplemental media asset to the member such that a member can view the supplemental media asset as a guide to answering the directed question posed in block 1510. In other words, the interactive system may access such supplemental media assets that further clarify, explain, or provide a background for the member to be able to understand and properly answer the directed question.

At block 1560, if the interactive system determines that the response is acceptable, then at block 1570, the interactive system may display the next segment of the media asset. In another embodiment, the system may display the next segment of the media asset if a response was not received at block 1520 or an unacceptable response was received at block 1560 without accessing a supplemental media asset.

In another embodiment, the guardians or parents of a child may define the questions and acceptable answers by using a dedicated authoring tool to create a customized version of the video, and more specifically fill in portions where there is an opportunity to engage the viewer with the question. Such action may result in the automatic creation of an additional template that the service relies on to overdub the questions and refine the communications flow.

Figures 16A, 16B:
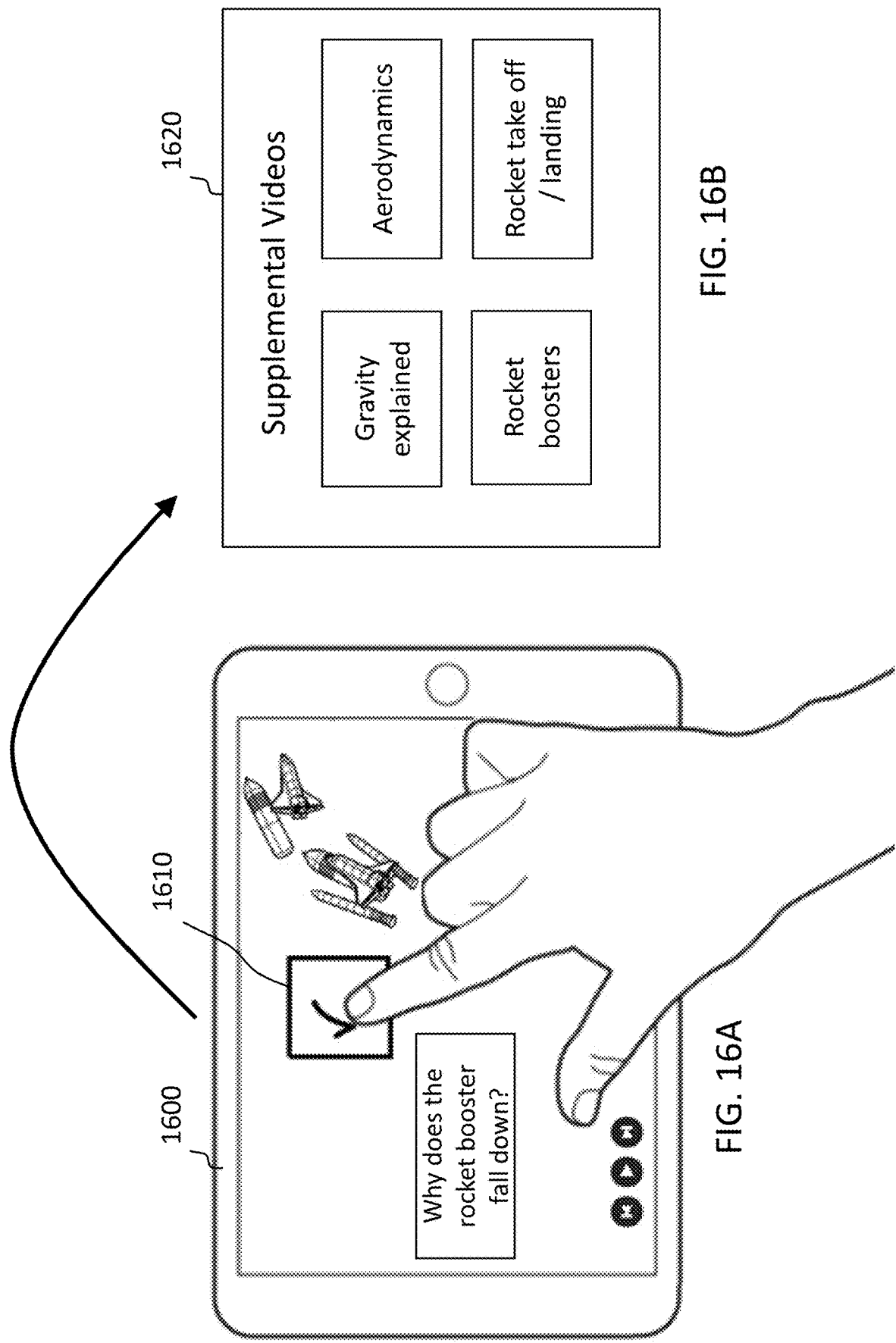
FIG. 16A is a block diagram of a response provided by a viewer using an electronic device, in accordance with some embodiments of the disclosure.
FIG. 16B is a block diagram of a list of supplemental videos, in accordance with some embodiments of the disclosure.

FIGS. 16A and B relate to supplemental videos. FIG. 16A is a block diagram of a response made on a user interface of an electronic device to a question presented in the media asset and FIG. 16B is a block diagram of a list of supplemental videos that aid in answering the question presented in FIG. 16B, in accordance with some embodiments of the disclosure.

As depicted in FIG. 16A, the viewer may select a response to a question that is directed to the viewer by using their user interface. In one example, the question presented, "Why does the rocket booster fall down," may be a multiple-choice question. If the viewer incorrectly responds to the question, provides no answer at all, or repeatedly provides an incorrect response, such as described in FIG. 15, then the system may generate a search template to access a plurality of supplemental videos. These videos are accessed to provide background and understanding on the topic related to the question to enable the viewer in correctly answering the question in FIG. 16A.

Figure 17:
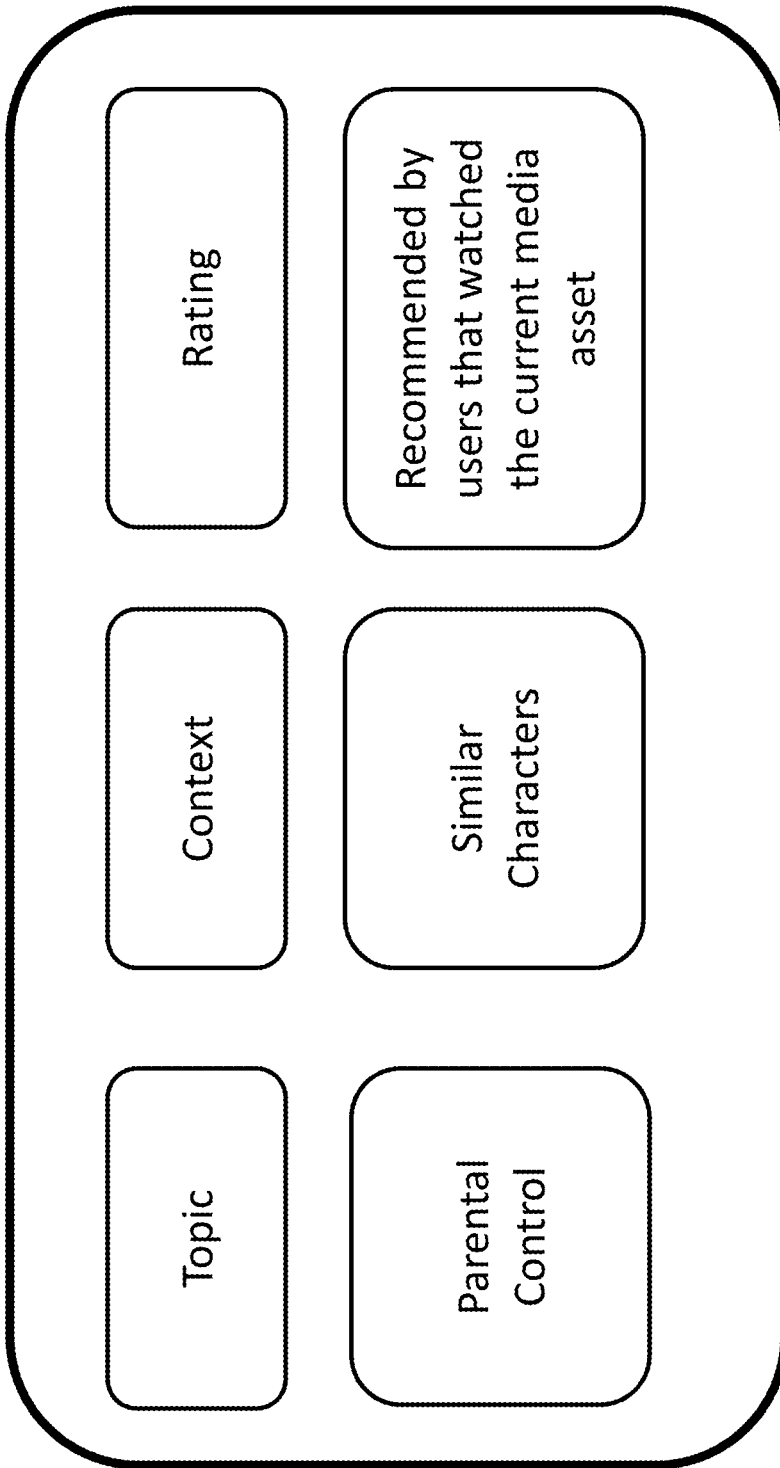
FIG. 17 is a block diagram of a template for searching supplemental videos, in accordance with some embodiments of the disclosure.

The search template, an example of which is depicted in FIG. 17, may determine relevant supplemental videos, and use search criteria such as topic, context, rating, parental control, characters that are similar in both videos, and supplemental videos that are recommended by other users that have also consumed the media asset currently being consumed by the viewer. The search criteria "Topic" may access only those supplemental videos that are topically related to the current media asset being consumed or the question being asked to the viewer. Likewise, the search criteria "context" may access those supplemental videos that are contextually related to the question directed at the viewer or the media asset being consumed. If the search results in a plurality of supplemental video assets, then a rating or some other criterion may be used to select those supplemental video assets that rank higher in rating. The search template may also include parental control parameters that were configured in the media device on which the media asset is being watched and use those parental control criteria to access those supplemental videos that are aligned with the parental criteria configured, such as a G rating etc. Similar characters may be another search criteria used to find supplemental media assets that include the same characters that are in the current media asset being consumed. Yet another search criteria may be to access those supplemental videos that are recommended by other users who have also consumed the currently displayed media asset.

In one embodiment, as depicted in FIG. 16B, using the search template of FIG. 17, the following supplemental videos may be accessed: "Gravity explained," "Aerodynamics," "Rocket boosters," and "Rocket take off/landings," as they are related to the question presented in FIG. 16A.

Figure 18:
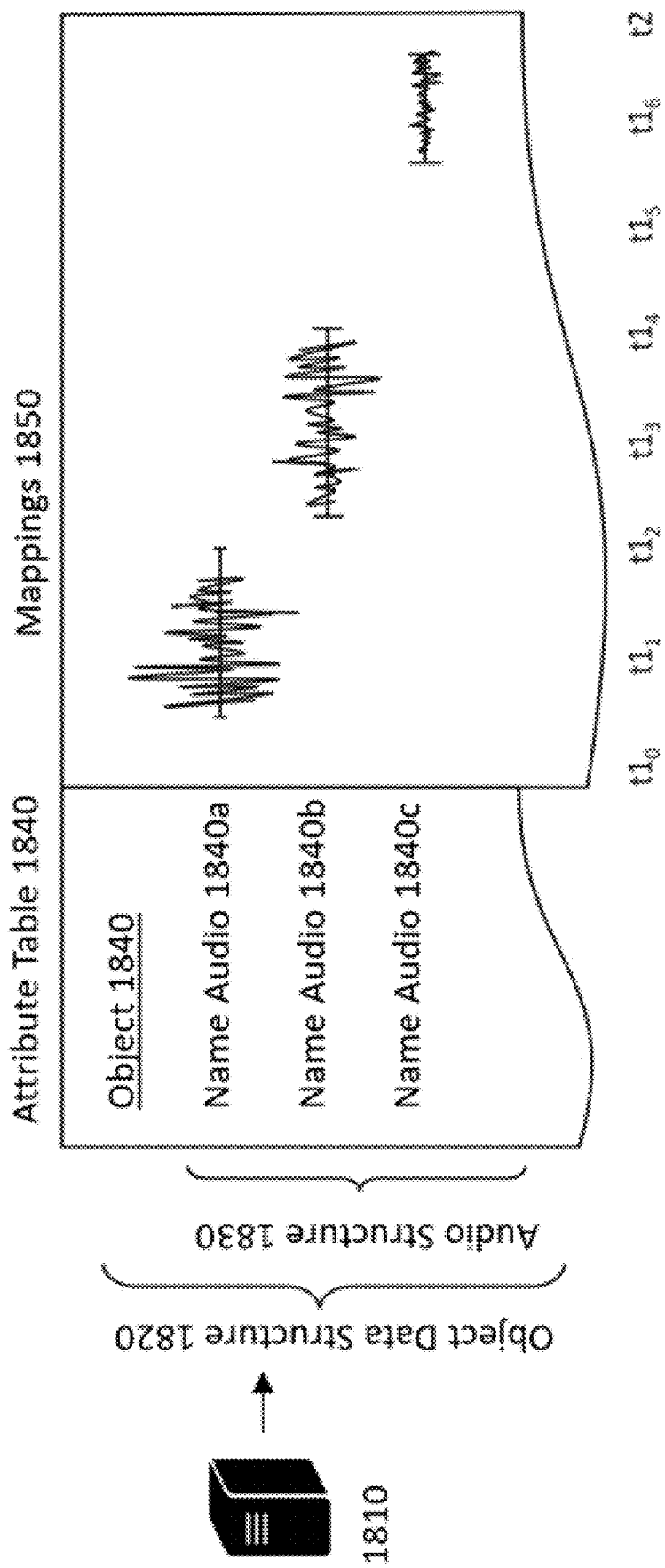
FIG. 18 is an exemplary content structure of a character name uttered over a course of time t1 to t2, in accordance with some embodiments of the disclosure.

FIG. 18 is an exemplary content structure of a character name uttered over a course of time t1 to t2, in accordance with some embodiments of the disclosure. In one embodiment, the system, such as the system depicted in FIG. 1, may analyze the utterance of a character name in the media asset. In other embodiments, the system may only analyze selected instances of the uttered character name if only certain instances are to be examined for being replaced with the preferred name.

The content structure 1800 includes an attribute table 1830 generated from a caption file of the media asset. The attribute table 1830 may also be generated by other means, such as audio and video analysis of the media asset.

The content structure 1800 includes a mapping 1840 for each utterance of the character name in the attribute table 1830. The audio structure 1810, which is part of the object data structure 1820 contains other types of mappings, such as text or video mapping, in addition to the audio mapping 1840.

In one embodiment, the audio track 1840a may represent the utterance of the character name in the media asset at a first location or by a second character; audio track 1840b may represent the utterance of the character name in the media asset at a second location or by a second or third character; and audio track 1840c may represent the utterance of the character name in the media asset at a third location or by a second or third character. Each audio track 1840a-c may further list attributes including audio type, frequency, pitch, volume, pace, etc. of the locations at which the character name was uttered. These attributes may vary from the utterance of the character name at one location in the media asset to another location in the media asset. These may also vary based on which other character is uttering the character's name and the context. For example, if the character whose name being uttered is Woody, then Sid, Andy, and Buzz, who may also be characters in the media asset may each utter Woody's name in a different manner, frequency, pitch, volume, pace, etc. They may also utter Woody's name differently under different contexts, e.g., if Woody is about to get run over by a bus, then Buzz may yell out his name whereas Buzz may softly utter his name if Woody is trying to be quiet in a room.

The system may analyze objects 1840a-c in the attribute table 1830 and their associated mappings 1850. The analysis may be performed to determine which utterance of the character name in the media asset is to be replaced with the preferred name. In one embodiment, the system may replace all the utterances of the character name 1840a-c and in another embodiment, the system may select a specific utterance to replace.

In one embodiment, if object 1840a is selected, the system may generate metatags for the object 1840a and also determine the start and end timestamp for this specific utterance 1840a of the character name from the associated mapping 1850, e.g., between $t1_0$ to $t1_2$.

The timestamps of the start and end times of the metadata tags, which relate to the utterance of the character name at specific times in the media asset, may then be used to replace the audio with the audio of the preferred name. In some embodiments, the audio of the preferred name may be synthesized either in the character's voice or in the voice of the viewer/consumer consuming the media asset and associated with the character. Further details relating to the replacement of the audio is provided in FIG. 19 below.

Figure 19:
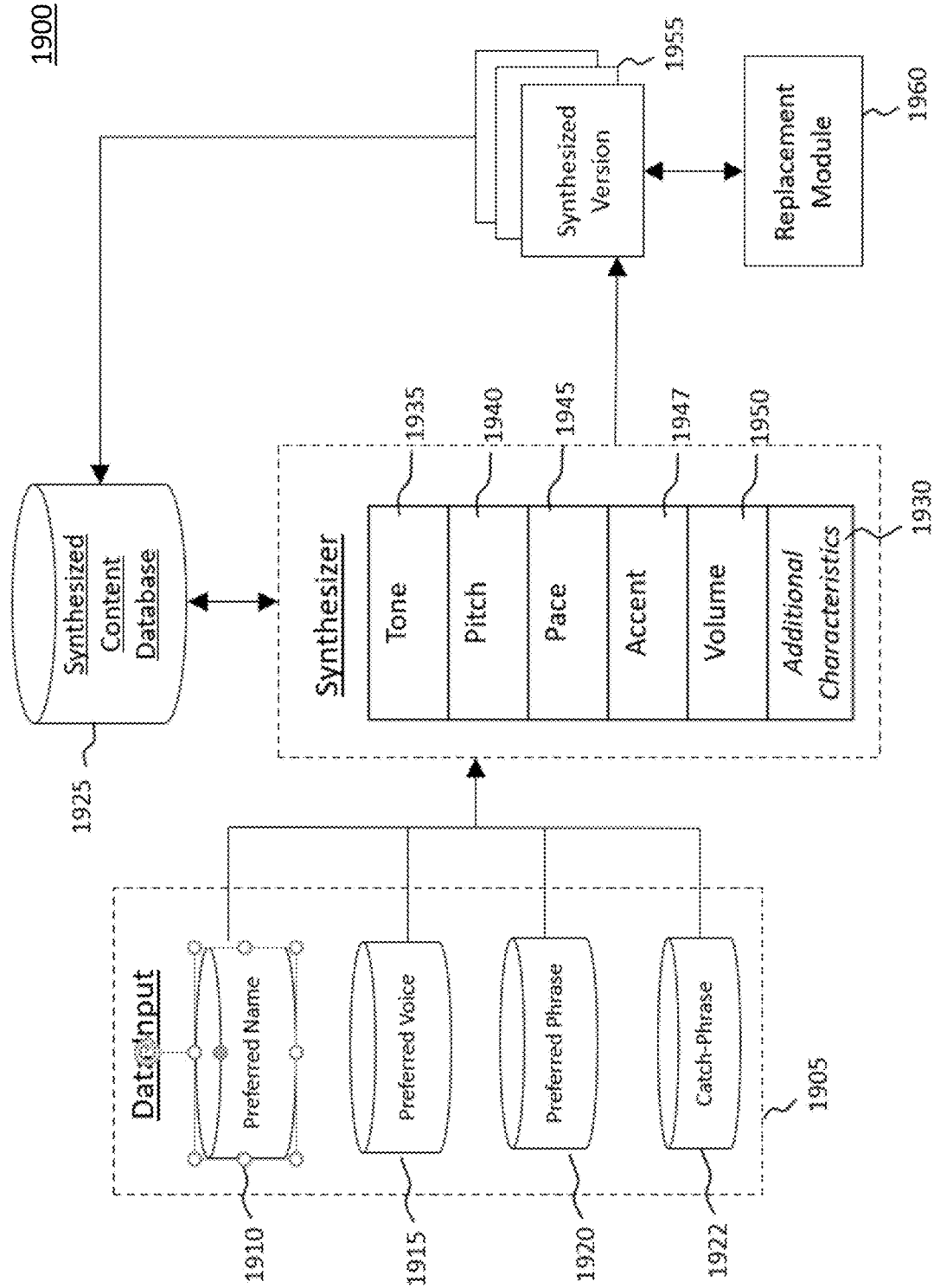
FIG. 19 is a diagram of information flow into a replacement module for replacing names, voices, and phrases in the media asset, in accordance with some embodiments of the disclosure.

FIG. 19 is a diagram of information flow into a replacement module for replacing names, voices, and phrases in the media asset, in accordance with some embodiments of the disclosure. The diagram also depicts synthesizing of inputs, generating synthesized files and storing the files into a storage, which is accessed by the replacement module as needed to replace the character name or voice, or to replace a phrase in the media asset, or to replace a catch-phrase in the viewer's voice.

In process 1900, the inputs 1910-1922 include inputs of text into a keyboard or a remote control, utterance of voice, phrase, or catch-phrase into a remote control or a speaker of the media device displaying the media asset, of the input using other hardware or software means to input textual or audio information.

The system also includes electronic device communications inputs using electronic devices associated or owned by the viewer, such as mobile phone, tablet, gaming device, remote control, laptop computer, or another type of electronic communication device. The inputs from the devices may be SMS and MMS texts, postings, messages, emails, voice recordings, or speech to text input.

The system input may also include automated inputs as a result of ML algorithms analyzing the consumption history of media assets consumed and the changes made to names previously by the viewer.

The system inputs may also include user inputs through the user's profile that has been populated by the user or user profile or associated profile populated by a parent or caretaker of a child.

The inputs may also be through a side car caption file that includes changes to a character's name, voice, phrase etc.

In one embodiment, the input is a preferred name 1910 and in another embodiment the input is a preferred voice 1915, a preferred phrase 1920, and/or an utterance of a catch-phrase 1922 in the viewer's voice.

In one embodiment, the preferred name 1910 may be a name given by a viewer, i.e., a name the viewer prefers instead of the originally given name to the character in the media asset. The preferred name may also be obtained as an input based on an analysis performed by the ML algorithm and the AI algorithm. For example, a ML algorithm may analyze the consumption history of a viewer to determine the name changes the viewer has made previously while consuming other media assets. The data analyzed may be fed into an AI algorithm The AI algorithm may analyze the pattern provided by the ML algorithm and based on the pattern, and the context around the pattern, provide suggestions to change the name of a character in the currently displayed media asset and provide one or more suggestions for a preferred name. For example, the viewer may have to change the character's name with a preferred name in the past for only those characters that are male, or only those characters that are prominent in the media asset, or only those characters that are involved in a sports activity. Whatever the context may be, AI algorithms may analyze the context in relation to the pattern and use the analyzed data to suggest the character and the name of the character to be replaced with the preferred name.

In one embodiment, the data input may be a preferred voice 1915. For example, the viewer may wish to other a name or a phrase in the media asset in their own voice or in the voice of another desired person or character. As such the data input for preferred voice 1915 may be and put it through a remote control, microphone of the media device, USB input, or any other input through an electronic device.

In one embodiment, the data input may be a preferred phrase 1920. In this embodiment, the user may prefer a particular phrase to be uttered by their favorite character. As such, the viewer or the system may identify locations at which the preferred phrase may be uttered by their favorite character. In some instances, the preferred praise may replace another phrase uttered by the character.

In one embodiment, the data input may be a preferred catchphrase 1922. In this embodiment, the viewer may after the same catch phrase that is uttered by the character in their own voice or in the voice of someone else other than the character. The catch phrase may be inputted through a remote control, microphone of the media device, USB input, or some other audio input.

In one embodiment, the data inputs 1910-1922 may be fed into a voice synthesizer. The synthesizer may combine several elements of voice and sound to produce speech that is in sync with the characters voice or with the characters video output such that it appears in the media asset as if the character is uttering the name, phrase, or catchphrase in the manner as uttered by the character.

In one embodiment, the voice synthesizer may convert text-to-speech and is programmed to include all the phonemes and grammatical rules of a language that allow the utterance of the character name, phrase, or catchphrase to be uttered and pronounced correctly. The synthesizer may also be a card that is inserted into the system, or a separate device attached to the system, or be remote such that it can be accessed through various software implementations.

In one embodiment, the voice synthesizer may synthesize the data inputs for tone 1935, pitch 1940, piece 1945, accent 1947, volume 1950, or additional characteristics 1930, such as frequency and other voice attributes.

In one embodiment, once synthesized, the synthesized files may be placed into a synthesized content database 1925. The synthesized files 1955 may be accessed by a replacement module 1960.

In one embodiment, the replacement module may access a synthesized file as needed in order to replace a specific utterance of a character name with the synthesized preferred name. For example, referring to FIG. 18, if the utterance of the character name between timestamps between $t1_0$ to $t1_2$ is to be replaced with a preferred name, then the system would access a synthesized file that is specific for timestamps between $t1_0$ to $t1_2$ and use it to replace the character name. Since the manner of utterance of a character name may be different at each location in the media asset, a specific synthesized file that voice matches the utterance at the particular location is accessed and used for replacing the original character name.

It will be apparent to those of ordinary skill in the art that methods involved in the above-mentioned embodiments may be embodied in a computer program product that includes a computer-usable and/or—readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising;
   receiving a preferred name for a first character in a media asset displayed on a media device;
   identifying locations in the media asset where the first character's name is uttered by a second character in the media asset;
   displaying a plurality of name replacement options that include a first name replacement option to replace the first character's name to the preferred name at the identified locations; and
   in response to receiving a selection of the first name replacement option:
      determining if the media asset is part of a group watch, wherein the group watch includes a plurality of members that desire to consume the media asset;
      in response to determining that the media asset is part of a group watch:
         synthesizing the preferred name using a voice synthesizer based on a context of an utterance of the first character's name;

querying the plurality of members to obtain approval of the synthesized preferred name for the first character; and
replacing the first character's name with the synthesized preferred name at the identified locations upon obtaining the approval.

2. The method of claim 1, wherein, replacing the first character's name with the synthesized preferred name at the identified locations further comprises:
generating metadata tags for each utterance of the first character's name by the second character;
determining a start and end timestamp for each generated metadata tag; and
replacing an audio segment between the start and end timestamp with an audio segment of the synthesized preferred name.

3. The method of claim 1, wherein, displaying the plurality of name replacement options includes displaying a second name replacement option to change the first character's name to the preferred name in a second media asset that is part of a series of the media asset.

4. The method of claim 3, further comprising:
accessing a closed caption file of the second media asset;
identifying text within the closed caption file where the first character's name is uttered by another character in the second media asset; and
replacing the identified text with the synthesized preferred name.

5. The method of claim 1, wherein, displaying the plurality of name replacement options includes displaying a third name replacement option to change the first character's name to the preferred name in another media asset that includes the first character.

6. The method of claim 1, wherein, replacing the first character's name with the synthesized preferred name further comprises:
analyzing characteristics of the second character's voice;
synthesizing the preferred name based on the characteristics of the second character's voice to match the audible sound of the preferred name in the second character's voice; and
replacing the first character's name with the synthesized preferred name to match the audible sound of the second character.

7. The method of claim 6, further comprising, synthesizing the preferred name to match the tone, context, and manner in which the first character's name was uttered by the second character.

8. The method of claim 1, wherein the preferred name is received from a viewer associated with the first character and replacing the first character's name with the synthesized preferred name includes replacing the first character's name in a voice of the viewer.

9. The method of claim 1, wherein, the approval is determined if a majority of the group members approve the synthesized preferred name.

10. The method of claim 1, wherein, replacing the first character's name with the synthesized preferred name at the identified locations is performed during the display of the media asset.

11. The method of claim 1, further comprising:
determining whether the media asset is part of a live watch, wherein the live watch includes a plurality of viewers consuming the media asset together in the same physical space; and
in response to determining that the media asset is part of the live watch:
determining whether the synthesized preferred name is approved by viewers associated with the live watch; and
in response to determining that the synthesized preferred name is approved by the viewers associated with the live watch, replacing the first character's name with the synthesized preferred name at the identified locations.

12. The method of claim 1, further comprising:
determining a different context at a second location in the media asset associated with the first character's name uttered by the second character; and
synthesizing the preferred name using the voice synthesizer that is to replace the utterance of the first character's name uttered by the second character at the second location based on the different context at the second location.

13. The method of claim 1, wherein the context of the utterance of the first character's name comprises any one of a tone, a speed, or a sentiment.

14. A method comprising:
receiving a phrase from a local input from a consumer of a media asset that is displayed on a media device;
identifying locations in the media asset where a first character speaks a phrase that is within a threshold of the received phrase;
displaying a plurality of options to replace the phrase spoken by the first character with the received phrase; and
in response to receiving a selection of an option, from the plurality of options;
determining if the media asset is part of a group watch, wherein the group watch includes a plurality of members that desire to consume the media asset;
in response to determining that the media asset is part of a group watch:
querying the plurality of members to obtain approval of the selected option, from the plurality of options; and
replacing the spoken phrase with a synthesized version of the selected option, wherein the synthesized version is based on a context of an utterance of the spoken phrase.

15. The method of claim 14, wherein, the threshold is a predetermined number of letters or words that are distinct from the phrase spoken by the first character.

16. The method of claim 14, wherein, the synthesized version of the received phrase is in a voice of the consumer of the media asset.

17. The method of claim 14, wherein, replacing the spoken phrase with a synthesized version of the received phrase further comprises:
generating metadata tags for each location in the media asset where the first character speaks the phrase that is within the threshold of the received phrase;
determining a start and end timestamp for each generated metadata tag; and
replacing an audio segment between the start and end timestamp with an audio segment of the synthesized version of the received phrase, wherein the synthesized version of the received phrase is in the consumer's voice.

18. A system comprising:
communications circuitry to access a media asset; and
control circuitry to:
- receive a preferred name for a first character in a media asset displayed on a media device;
- identify locations in the media asset where the first character's name is uttered by a second character in the media asset;
- display a plurality of name replacement options that include a first name replacement option to replace the first character's name to the preferred name at the identified locations; and
- in response to receiving a selection of the first name replacement option:
  - determine if the media asset is part of a group watch, wherein the group watch includes a plurality of members that desire to consume the media asset
  - in response to determining that the media asset is part of a group watch:
    - synthesize the preferred name using a voice synthesizer based on a context of an utterance of the first character's name; query the plurality of members to obtain approval of the synthesized preferred name for the first character; and
- replace the first character's name with the synthesized preferred name at the identified locations upon obtaining the approval.

19. The system of claim 18, wherein, replacing the first character's name with the synthesized preferred name at the identified locations further comprises, the control circuitry configured to:
- generate metadata tags for each utterance of the first character's name by the second character;
- determine a start and end timestamp for each generated metadata tag; and
- replace an audio segment between the start and end timestamp with an audio segment of the synthesized preferred name.

20. The system of claim 18, wherein, displaying the plurality of name replacement options includes, the control circuitry configured to display a second name replacement option to change the first character's name to the preferred name in a second media asset that is part of a series of the media asset.

21. The system of claim 20, wherein, in response to receiving the selection of the second name replacement option, the control circuitry configured to:
- access a closed caption file of the second media asset;
- identify text within the closed caption file where the first character's name is uttered by another character in the second media asset; and
- replace the identified text with the synthesized preferred name.

* * * * *